United States Patent
Takeda et al.

(10) Patent No.: US 10,820,317 B2
(45) Date of Patent: Oct. 27, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 16/073,167

(22) PCT Filed: Jan. 26, 2017

(86) PCT No.: PCT/JP2017/002643
§ 371 (c)(1),
(2) Date: Jul. 26, 2018

(87) PCT Pub. No.: WO2017/131065
PCT Pub. Date: Aug. 3, 2017

(65) Prior Publication Data
US 2019/0045506 A1  Feb. 7, 2019

(30) Foreign Application Priority Data

Jan. 29, 2016 (JP) ................... 2016-016195

(51) Int. Cl.
*H04W 72/04* (2009.01)
*H04W 48/08* (2009.01)
*H04L 5/00* (2006.01)

(52) U.S. Cl.
CPC ....... *H04W 72/0446* (2013.01); *H04L 5/0094* (2013.01); *H04W 48/08* (2013.01); *H04L 5/0091* (2013.01)

(58) Field of Classification Search
CPC .......... H04W 72/0446; H04W 72/044; H04W 48/08; H04L 5/0094; H04L 5/0091
(Continued)

(56) References Cited

U.S. PATENT DOCUMENTS 8,855,660 B2   10/2014 Ode et al.
9,295,045 B2 *  3/2016 Horiuchi ............... H04L 5/0053
(Continued)

FOREIGN PATENT DOCUMENTS

EP    2525608 A1   11/2012
WO  2011/086655 A1   7/2011

OTHER PUBLICATIONS

Extended European Search Report issued in the counterpart European Patent Application No. 17744295.1, dated Nov. 21, 2018 (11 pages).
(Continued)

*Primary Examiner* — Rownak Islam
(74) *Attorney, Agent, or Firm* — Osha Liang LLP

(57) ABSTRACT

In order to realize proper communication in the next-generation communication system, a user terminal that performs communication through a communication system in which a plurality of communication parameters is set, includes: a reception section that receives information on a partial resource used for the communication; and a control section that controls UL transmission and/or DL reception using a predetermined communication parameter, based on the information on the partial resource. The reception section receives the information on the partial resource using higher layer signaling, a common control channel which is common to the plurality of communication parameters, or a specific control channel dedicated to each of the communication parameters.

6 Claims, 19 Drawing Sheets

(58) Field of Classification Search
USPC .......................................................... 370/329
See application file for complete search history.

(56) References Cited

U.S. PATENT DOCUMENTS

| | | |
|---|---|---|
| 2012/0089880 A1* | 4/2012 | Nakao .................. H04L 1/1607 |
| | | 714/748 |
| 2012/0270540 A1 | 10/2012 | Ode et al. |
| 2015/0110059 A1* | 4/2015 | Bai ..................... H04W 72/042 |
| | | 370/329 |
| 2016/0020891 A1 | 1/2016 | Jung et al. |
| 2016/0270089 A1* | 9/2016 | Olfat ........................ H04L 5/00 |
| 2017/0215170 A1* | 7/2017 | Islam ................... H04L 5/0092 |
| 2018/0220404 A1* | 8/2018 | Awad ..................... H04W 4/70 |

OTHER PUBLICATIONS

International Search Report issued in PCT/JP2017/002643 dated Apr. 18, 2017 (1 page).
Written Opinion of the International Searching Authority issued in PCT/JP2017/002643 dated Apr. 18, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Chinese Patent Application No. 201780008858.4, dated Jul. 3, 2020 (11 pages).

* cited by examiner

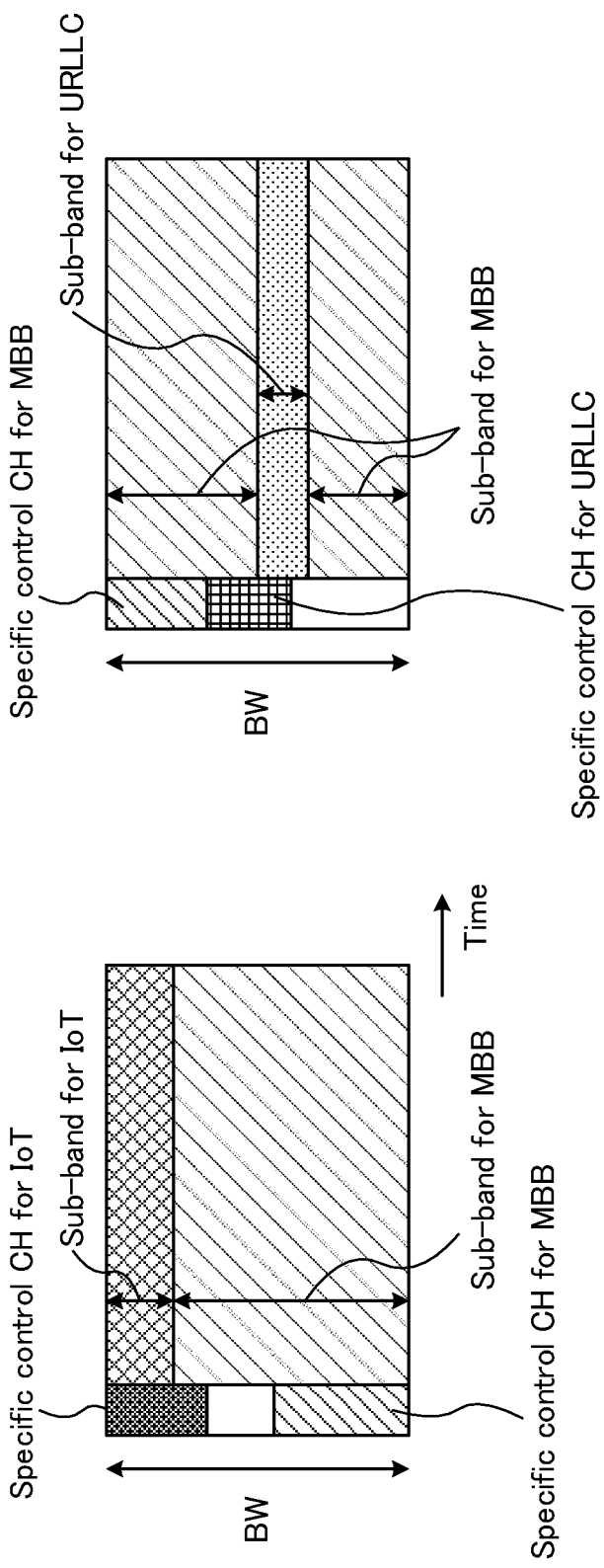
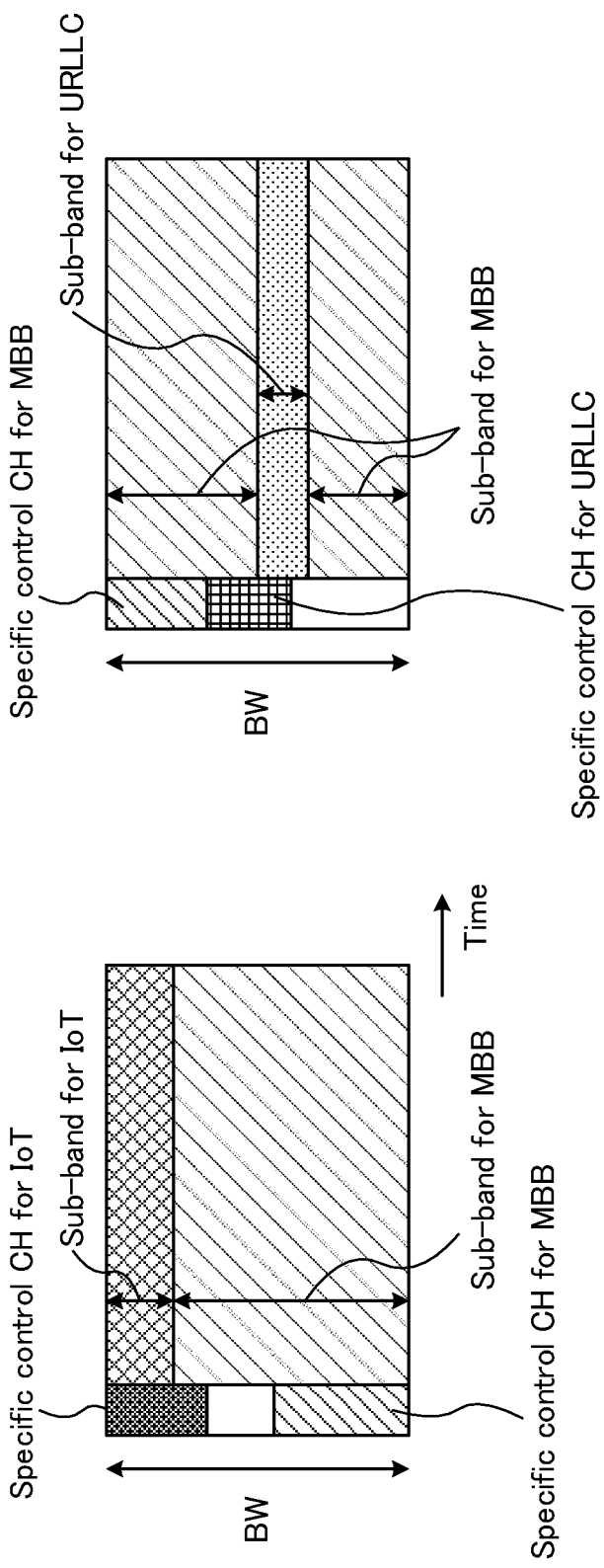
FIG. 12A
FIG. 12B

USER TERMINAL, RADIO BASE STATION AND RADIO COMMUNICATION METHOD

TECHNICAL FIELD

The present invention relates to a user terminal, a radio base station and a radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-Patent Literature 1). For the purpose of wider bands and higher speed than LTE (also called LTE Rel. 8), LTE Advanced (also called LTE Rel. 10, 11 or 12) has been specified, and a successor system (LTE Rel. 13 and beyond) has also been studied.

In LTE Rel. 10/11, in order to achieve a wider band, Carrier Aggregation (CA) which aggregates a plurality of component carriers (CC) is introduced. Each CC includes a system band of LTE Rel. 8 as one unit. Furthermore, in CA, a plurality of CCs in the same radio base station (eNB: eNodeB) is configured to a user terminal (UE: User Equipment).

On the other hand, in LTE Rel. 12, Dual Connectivity (DC) in which a plurality of cell groups (CG) in different radio base stations is configured to a user terminal is also introduced. Each cell group includes at least one cell (CC). Since in DC, a plurality of CCs in different radio base stations is aggregated, DC is also called Inter-eNB CA or the like.

In LTE Rel. 8-12 as described above, Transmission Time Interval (TTI) which is applied to DL transmission and UL transmission between the radio base station and the user terminal is set to 1 ms and controlled. TTI in the LTE system (Rel. 8-12) is also called a sub-frame length.

CITATION LIST

Non-Patent Literature

[Non-Patent Literature 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In a future radio communication system (for example, 5G), communication in a high-frequency band (for example, a several tens of GHz band) where a wide band is easily acquired and communication, such as IoT (Internet of Things), MTC (Machine Type Communication) and M2M (Machine To Machine), where a relatively small amount of data is used are assumed. Furthermore, there is also a growing demand for D2D (Device To Device) and V2V (Vehicular To Vehicular) communication where low latency communication is required.

Moreover, in 5G, unlike conventional radio communication, as a carrier frequency, a high-frequency band (for example, a 60 to 100 GHz band) is included in targets, and it has been studied to design a new communication access scheme (New RAT (Radio Access Technology)) corresponding to a wide range from a low-frequency band to a high-frequency band. Since the implementation difficulty and the propagation path environment of a radio circuit significantly differ depending on the frequency band, it is considered to introduce a plurality of different numerologies in the RAT of 5G. The numerology refers to the design of a signal in a certain RAT or a set of communication parameters which characterize the design of RAT.

Furthermore, in the future radio communication system, a form is also considered in which user terminals which employ different numerologies perform communication with the same carrier (or a frequency, a cell and a CC). It has not so far been specified how to control communication in a case where a plurality of numerologies (or communication access schemes) is introduced as described above. Hence, even in a case of performing communication using a plurality of numerologies, a control method for properly performing such communication is needed.

The present invention was made in view of such a respect, and it is an object of the invention to provide a user terminal, a radio base station and a radio communication method which can realize proper communication in the next-generation communication system.

Solution to Problem

A user terminal according to one aspect of the present invention is a user terminal that performs communication through a communication system in which a plurality of communication parameters is set, the user terminal including: a reception section that receives information on a partial resource used for the communication; and a control section that controls UL transmission and/or DL reception using a predetermined communication parameter, based on the information on the partial resource.

Advantageous Effects of Invention

According to the present invention, it is possible to realize proper communication in the next-generation communication system.

BRIEF DESCRIPTION OF DRAWINGS

FIGS. 12A and 12B are diagrams showing another example of the configuration method of partial resources in the present embodiment;

DESCRIPTION OF EMBODIMENTS

As an access scheme (also called New RAT, 5G RAT or the like) used in a future new communication system, an enhance version of the access scheme (also called LTE RAT, LTE-based RAT or the like) used in the existing LTE/LTE-A system has been studied.

Figure 1:
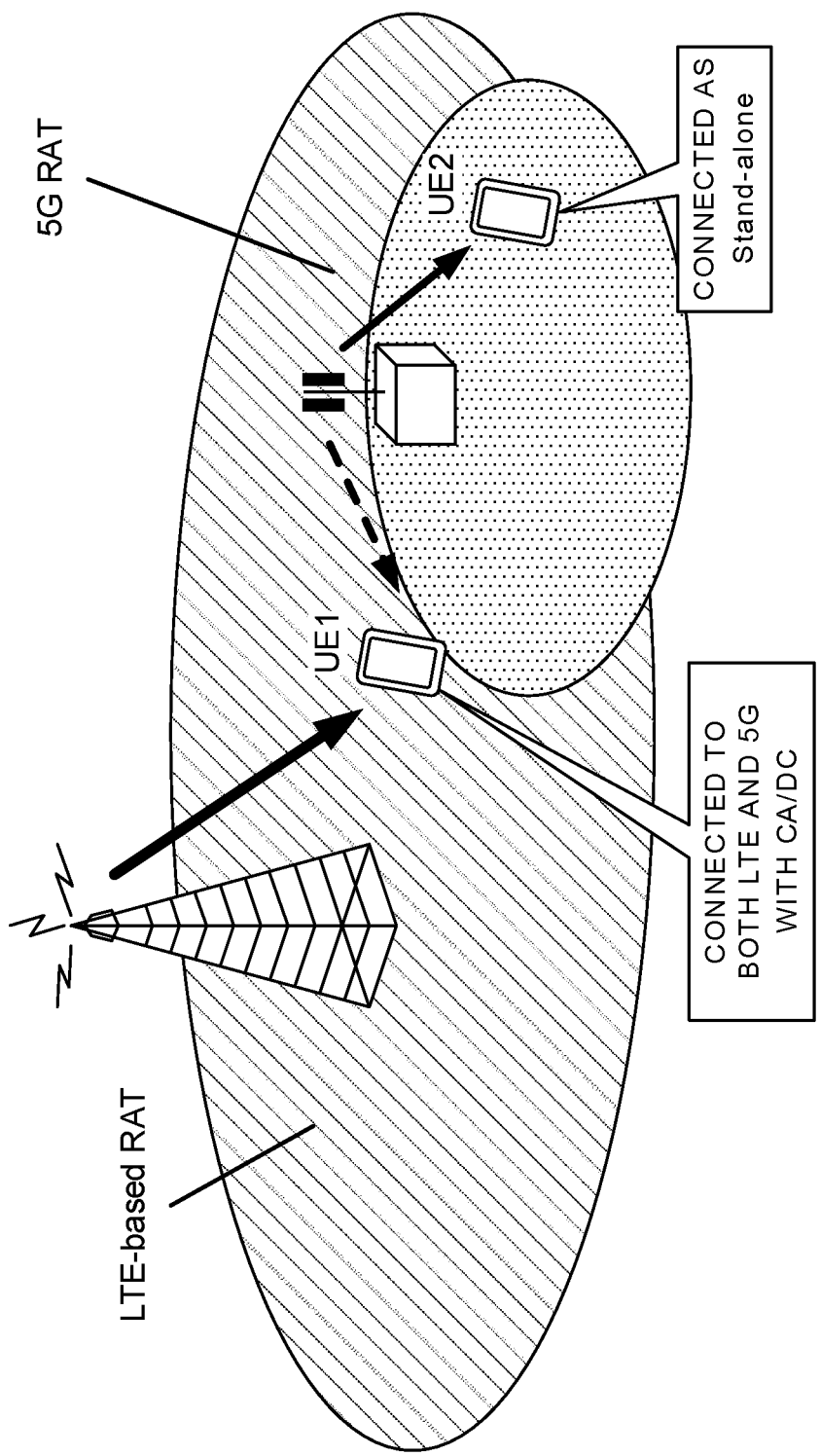
FIG. 1 is a diagram showing an example of an operation form of the future radio communication system.

A cell of New RAT may be arranged so as to overlap the coverage of a cell of LTE RAT or may be arranged independently. FIG. 1 shows a case where the cell of New RAT overlaps the coverage of the cell of LTE-based RAT.

It is considered to connect a user terminal (UE1) to both LTE system and 5G system by applying Carrier Aggregation (CA) and/or Dual Connectivity (DC). Further, in New RAT, the operation of stand-alone is also assumed. The stand-alone means that the user terminal operates (Camp) independently in New RAT. In this case, a user terminal (UE2) can be initially connected to New RAT.

In New RAT, it is also studied to use a radio frame and/or sub-frame configuration which is different from that of LTE RAT. For example, the radio frame configuration in New RAT can be set to the radio frame configuration in which at least one of a sub-frame length, a symbol length, a sub-carrier spacing, and a bandwidth is different from the existing LTE (LTE Rel. 8-12).

Note that the sub-frame may be called a Transmission Time Interval (TTI). For example, a TTI (sub-frame) length in LTE Rel. 8-12 is 1 ms and is composed of two time slots. The TTI is the transmission time unit of a data packet (transport block) which is subjected to channel coding and is the processing unit of scheduling, link adaptation and the like. The sub-frame length and the TTI length may be set or specified independently. For example, a plurality of TTIs may be included in one sub-frame.

More specifically, although in New RAT, a new communication parameter is specified, for example, a method of multiplying, by a factor of a constant (for example, by a factor of N or 1/N), the parameters (for example, the sub-carrier spacing, the bandwidth and the symbol length) forming the radio frame in LTE based on the numerology of LTE RAT and of using them has also been studied. Here, the numerology refers to the design of a signal in certain RAT or a set of communication parameters (radio parameters) which characterize the design of RAT. Note that a plurality of numerologies may be specified and used with one RAT.

Figure 2A:
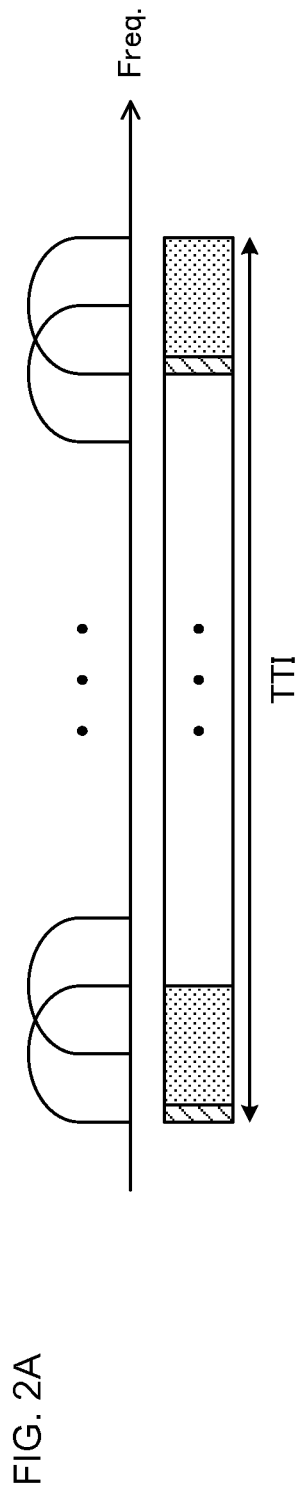
FIGS. 2A to 2C are diagrams showing another example of the operation form of the future radio communication system.
Figure 2B:
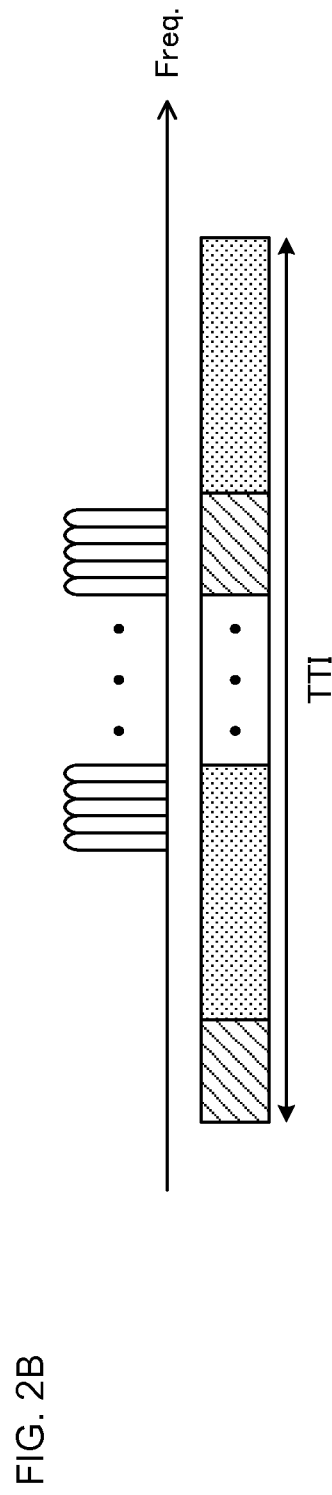
Figure 2C:
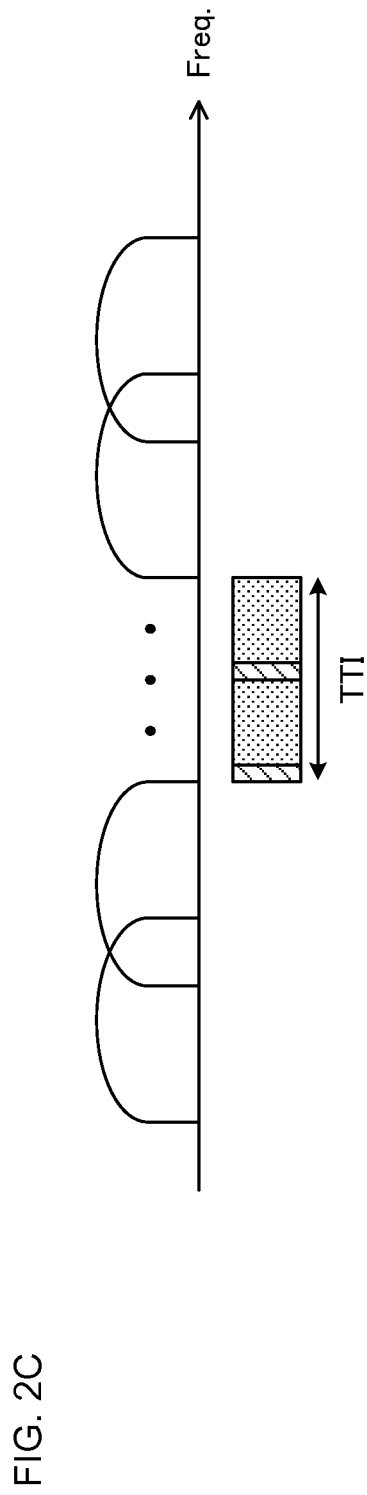

Furthermore, a plurality of different numerologies indicates, but not limited to, a case where for example, at least one of items (1) to (6) below is different among them:

(1) sub-carrier spacing
(2) CP (Cyclic Prefix) length
(3) symbol length
(4) number of symbols per TTI
(5) TTI length
(6) filtering processing or windowing processing As described previously, in New RAT, as carrier frequencies, extremely wide frequencies (for example, 1 to 100 GHz) are targeted. It is desirable that New RAT can be used in the communication of various applications (services) and can accommodate user terminals where various circuit configuration, circuit sizes, and software are implemented. Hence, it is conceived to support a plurality of designs (numerologies) where the symbol length, the sub-carrier spacing and the like are different, according to requirement conditions for each application (see FIG. 2).

It is conceived to set, as a plurality of numerologies, for example, requirement conditions such as an MBB (Mobile Broad Band) service, an IoT service and a URLLC (ultra-reliable and low latency communication) service and to individually specify numerologies which satisfy them. In MBB, in order to achieve high frequency usage efficiency, a numerology which can support the reduction of overhead and high-order MIMO is desirable (see FIG. 2A). In IoT, in order to achieve high power usage efficiency and wide coverage, a numerology which takes into account narrower bandwidth and redundancy is desirable (see FIG. 2B). In URLLC, in order to achieve high response performance, a numerology which takes into account TTI shortening and high quality is desirable (see FIG. 2C). Note that the forms of services to which the present embodiment can be applied are not limited to the above.

Figure 3:
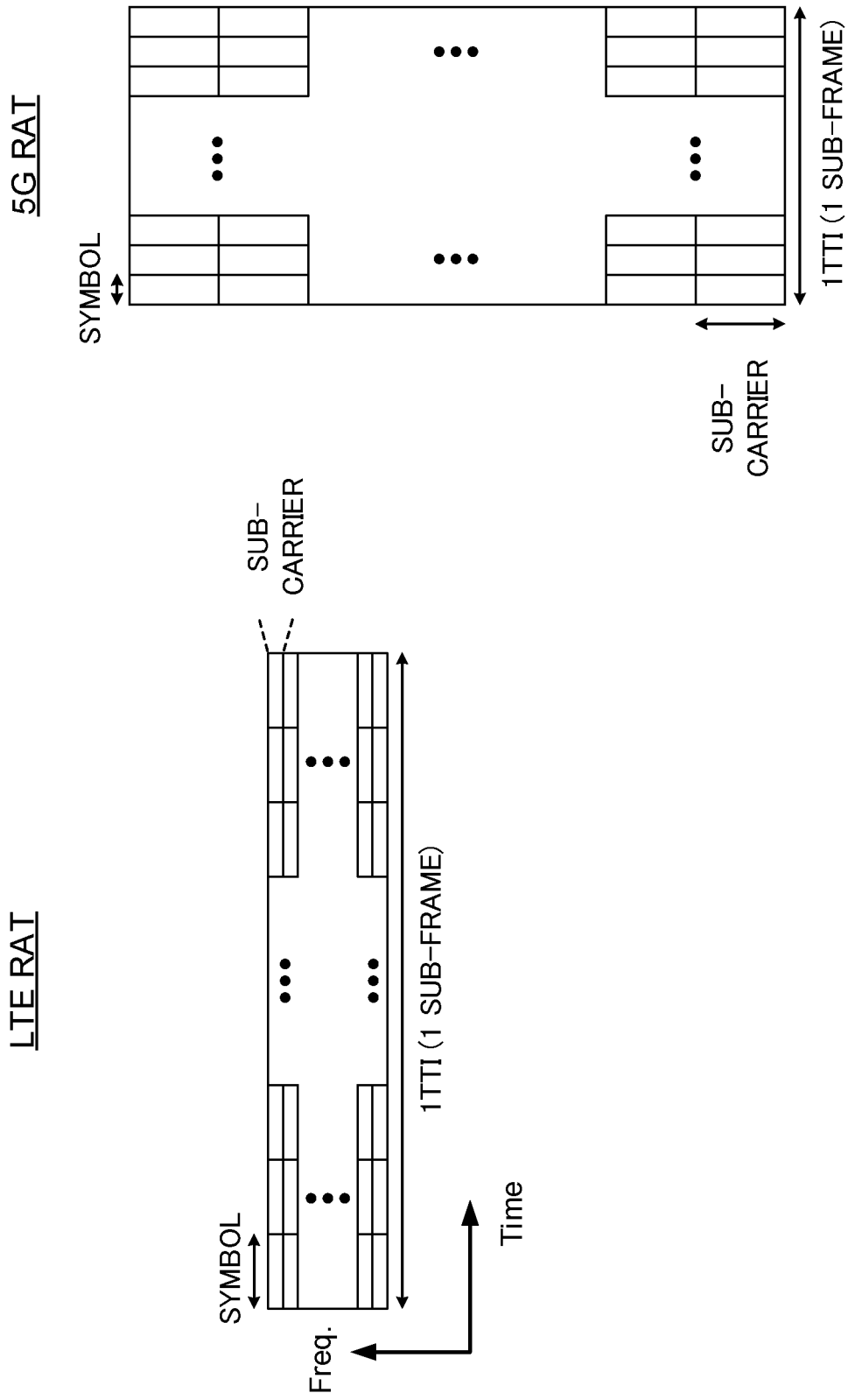
FIG. 3 is a diagram showing an example of communication parameters applied to LTE RAT and 5G RAT.

Further, it is conceived to employ a configuration in which, as an example of the numerology adopted in 5G RAT, the sub-carrier spacing and the bandwidth are multiplied by a factor of N (for example, N>1) and the symbol length is multiplied by a factor of 1/N with reference to LTE RAT. FIG. 3 is a diagram showing examples of the sub-frame configuration in LTE RAT and the sub-frame configuration in 5G RAT.

In FIG. 3, in LTE RAT uses the sub-frame configuration in the existing LTE in which a control unit is formed with 1 ms (14 OFDM (Orthogonal Frequency Division Multiplexing) symbols/SC-FDMA (Single-Carrier Frequency Division Multiple Access) symbol) and 180 kHz (12 sub-carriers).

In FIG. 3, 5G RAT uses the sub-frame configuration (TTI configuration) in which the sub-carrier spacing is longer and the symbol length is shorter than in LTE RAT. It is possible to reduce a processing delay in the control and reduce a delay time by shortening the TTI length. Note that a TTI (for example, a TTI which is less than 1 ms) which is shorter than the TTI used in LTE may be called a shortened TTI.

With the configuration of FIG. 3, the TTI length can be shortened, and thus it is possible to reduce a time necessary for transmission and reception, with the result that it becomes easier to realize low latency. Further, it is possible to reduce the influence of a phase noise in a high-frequency band by increasing the sub-carrier spacing and the system bandwidth as compared with the existing LTE. Thereby, it is possible to suitably realize high-speed communication which introduces, into 5G RAT, a high-frequency band (for example, a several tens of GHz band) in which a wide band is easily acquired and uses massive MIMO using, for example, a large number of antenna elements.

Furthermore, it is also conceived to employ a configuration in which, as another example of the numerology, the sub-carrier spacing and the bandwidth are multiplied by a factor of 1/N and the symbol length is multiplied by a factor of N. With this configuration, since the entire length of the symbol is increased, even when the ratio of a CP length to the entire length of the symbol is constant, it is possible to increase the CP length. Thereby, it is possible to perform radio communication which is more resistant (robust) to fading in a communication path.

In 5G RAT, a control unit is not limited to an existing one resource block (RB) pair (14 symbols×12 sub-carriers). For example, the control unit may be a new predetermined region unit (also called, for example, an enhanced RB (eRB)) that is specified as a radio resource region different from the existing one RB or may be the unit of a plurality of RBs.

In addition, it is conceived to operate a plurality of services having different numerologies with the same carrier in the radio communication of 5G, in order to effectively utilize frequencies. For example, it is also conceived to operate the services by simultaneously accommodating user terminals (user terminals which utilize, for example, MBB, IoT and URLLC) which communicate with different numerologies in a New RAT carrier (for example, a frequency, a cell and a CC).

For example, as the carrier frequency becomes lower, radio waves are more unlikely to be attenuated, and thus the influence of a delay path in a propagation path is increased whereas as the carrier frequency becomes higher, radio waves are more attenuated, and thus a delay path observed is decreased. Moreover, as the carrier frequency becomes higher, the influence of a phase noise produced in a radio (RF) circuit is increased. Hence, although for example, in a case where an OFDM or OFDM-based access scheme as 5G RAT is adopted, when the carrier frequency is low, a cyclic prefix (CP) for reducing the influence of a delay path needs to be provided longer, the influence of a phase noise is low, and thus it is possible to narrow the sub-carrier spacing. By contrast, although when the carrier frequency is high, the influence of a delay path is low, and thus it is possible to shorten the CP, the influence of a phase noise is high, and thus it is necessary to provide a sufficiently wide sub-carrier spacing. In the OFDM or OFDM-based access scheme, the CP length and the sub-carrier spacing are parameters for determining the symbol length, and it is found that when appropriate parameters are adopted according to the frequency band, it is necessary to introduce different numerologies.

Figure 4:
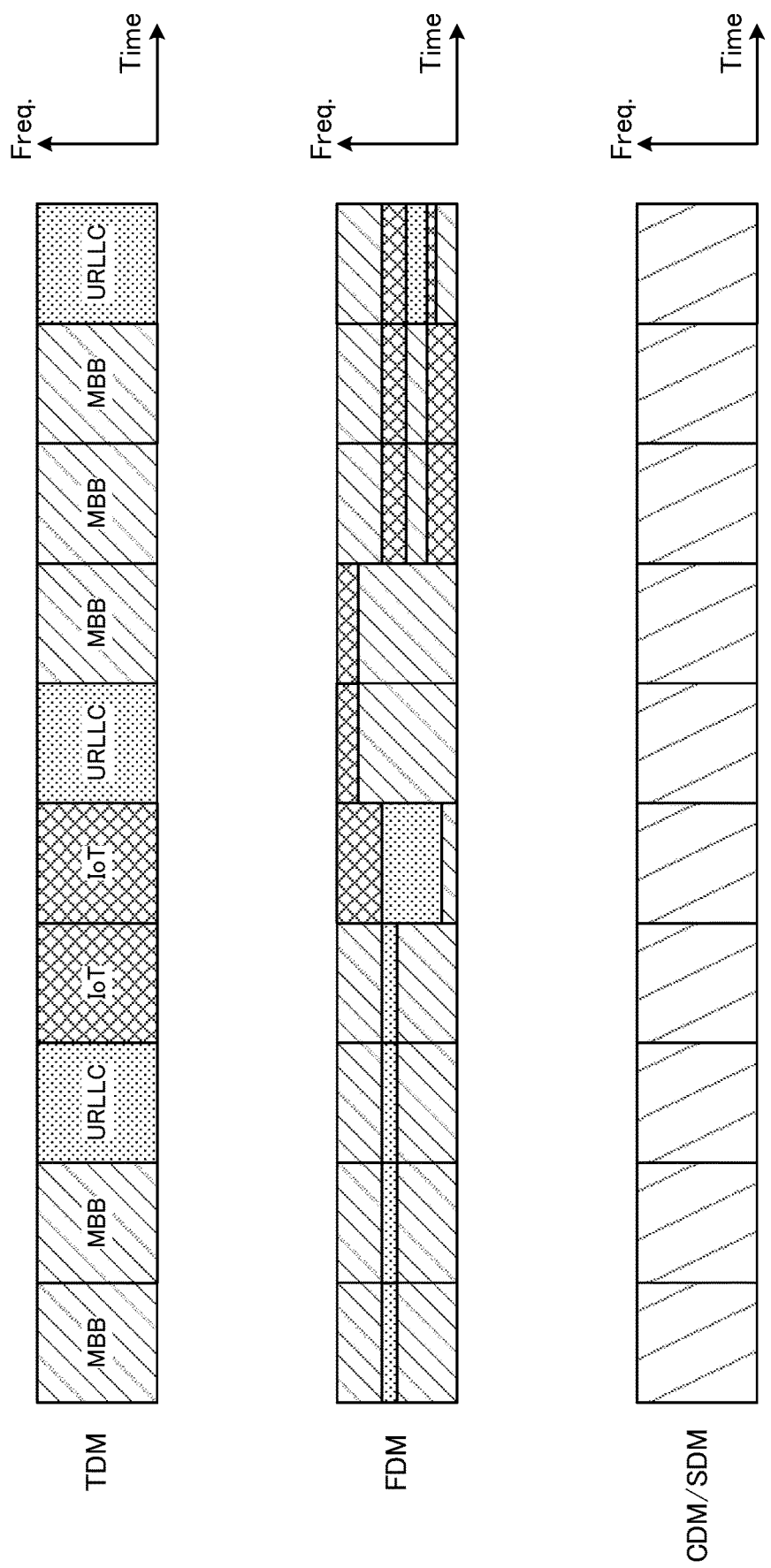
FIG. 4 is a diagram showing an example of a case where a plurality of numerologies is multiplexed on the same carrier.

It is conceived to employ any of time division multiplexing (TDM), frequency division multiplexing (FDM), code division multiplexing (CDM), space division multiplexing (SDM) and the like or a combination thereof, as a method of simultaneously accommodating and operating user terminals which perform communication using different numerologies (see FIG. 4). Further, when user terminals which utilize different numerologies with the same carrier communicate with each other, it is preferable in terms of frequency usage efficiency to flexibly change and control at least one resource of the frequency, the time, the code and the space.

In the existing LTE system, such a configuration is adopted that controls scheduling of downlink data and uplink data dynamically (for example, for each TTI) using an L1/L2 control channel. Hence, when the mechanism of the existing LTE system is applied, it is possible to flexibly change and control resources for the downlink data and uplink data for each of the different numerologies.

However, the existing LTE system does not have a mechanism for dynamically changing broadcast information, the frequency of the L1/L2 control channel itself and/or a time resource. An example of a method of performing transmission and reception in the existing LTE system will be described below.

In the existing LTE system, the user terminal first receives broadcast information (PBCH) which does not depend on the frequency bandwidth so as to acquire system information on part of the carrier. Then, the user terminal receives broadcast information (SIB) which depends on the frequency bandwidth with a downlink shared channel (PDSCH). The L1/L2 control channel (for example, PDCCH) for scheduling the SIB is interleaved and mapped over the entire band based on a function of the frequency bandwidth.

How many OFDM symbols the PDCCH is mapped is indicated by PCFICH. The PCFICH is mapped so as to spread over the entire band based on a function of the frequency bandwidth. The user terminal receives the PCFICH and the PDCCH which are mapped with a rule depending on the frequency bandwidth, and thereafter controls the reception of the downlink data (PDSCH) and the transmission of the uplink data (PUSCH), based on the PDCCH.

Figure 5:
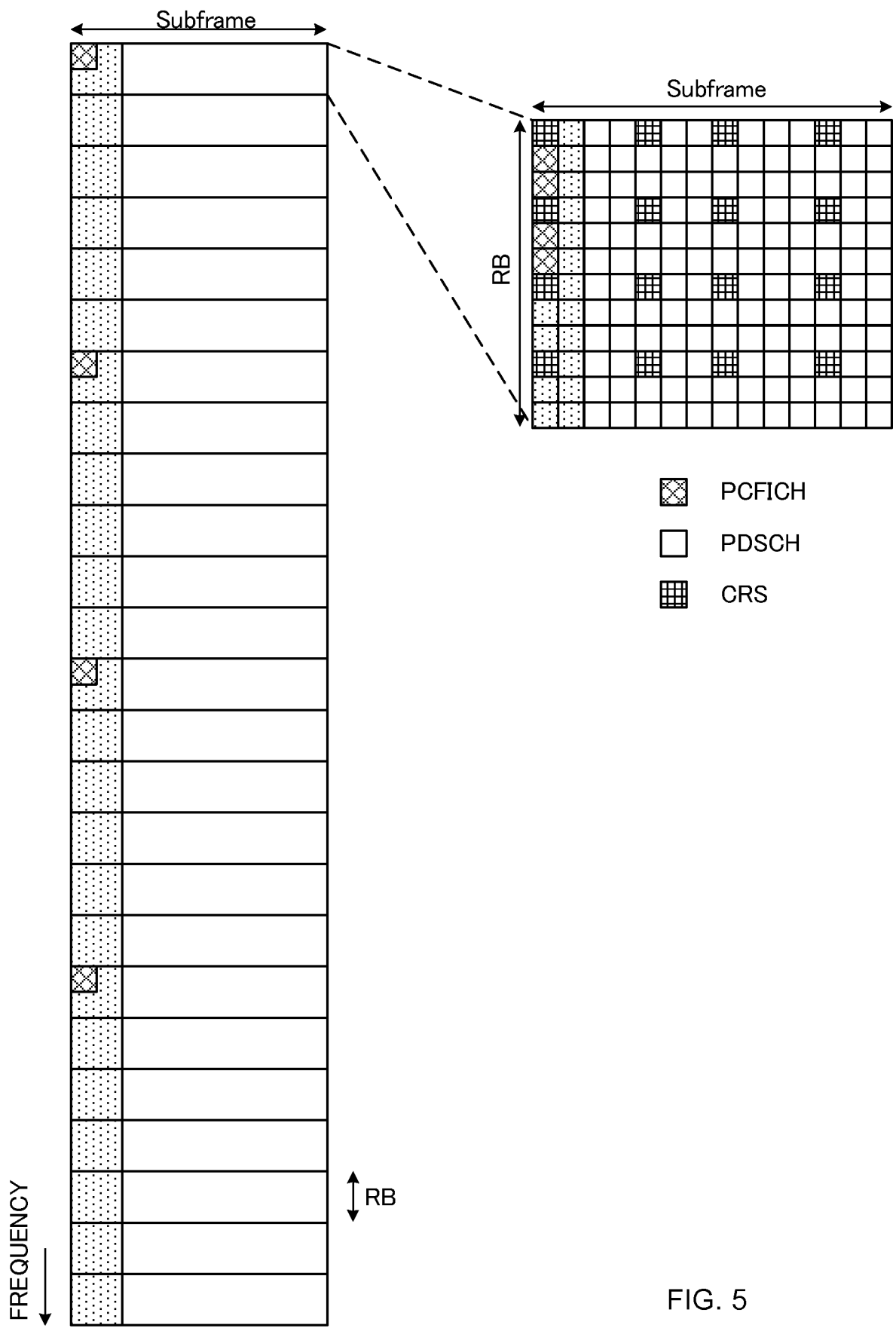
FIG. 5 is a diagram showing an example of mapping of PCFICH in an existing system.

In the existing system, the PCFICH is used to notify the number of OFDM symbols (or the front symbol of the PDSCH) used for the PDCCH, and is mapped to only the leading OFDM symbol of a sub-frame (see FIG. 5). The PCFICH is arranged in a system band with a 4 REGs (Resource Element Group). The radio base station notifies the user terminal of the number of OFDM symbols (CFI: Control Format Indicator) for assigning the PDCCH in each sub-frame as information of 2 bits using the leading OFDM symbol of the sub-frame.

Figure 6:
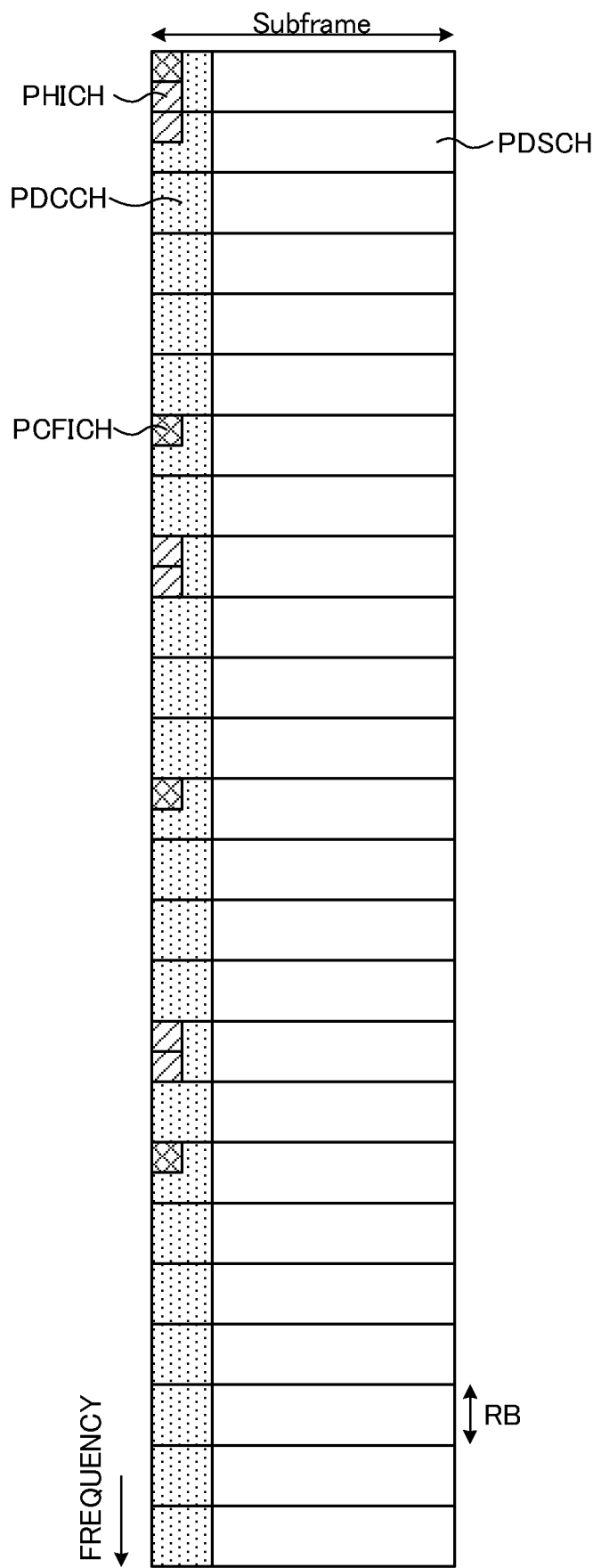
FIG. 6 is a diagram showing an example of mapping of PDCCH in the existing system.

The downlink control channel (PDCCH) is used for notification of the scheduling of DL or UL and the like and is mapped to resources to which the PCFICH/PHICH is not assigned among the leading 1 to 3 (or 1 to 4) symbols of the sub-frame (see FIG. 6). The radio base station arranges, based on a search space configured on the PDCCH for each user terminal, downlink control information in the search space, and transmits it.

As described above, in the existing LTE system, there is a mechanism in which the PCFICH and the PDCCH are mapped to resource elements (RE) with a mapping rule which is uniquely determined as the function of the frequency bandwidth. In other words, unless the bandwidth for communication is changed, it is impossible to change the position to which a control channel (for example, the L1/L2 control channel) is mapped.

Hence, the present inventors et al. conceive to adopt a configuration in which, when communication is performed through a communication system where a plurality of numerologies (communication parameters) is respectively configured to a plurality of user terminals, information on resources (partial resources) used for the communication is notified to the user terminal configured with each numerology (communication parameter), and the user terminal uses a predetermined communication parameter in the partial resources to perform the communication.

Further, the present inventors et al. conceive to notify the user terminal of the information on the partial resources using higher layer signaling, a physical control channel common to a plurality of numerologies (common control channel) or a dedicated physical control channel for each numerology (specific control channel, dedicated control channel).

Thereby, in the communication system in which a plurality of numerologies (communication parameters) is supported, it is possible to flexibly change resources which are applied to the transmission of a DL channel (control channel and/or data channel) corresponding to each numerology.

The present embodiment will be described in detail below. In the following description, resources which are used for communication of user terminals using a predetermined numerology are called, but not limited to, the "partial resources". Furthermore, the partial resources corresponding to each numerology may be resources in which at least one of the frequency, time, code and space differs between a plurality of numerologies or may be resources in which the entire or part thereof differs.

Further, although in the following description, as an operation form (service form) utilizing the numerology, examples of MBB, IoT and URLLC will be described, the operation form to which the present embodiment can be applied is not limited to such an operation form. Furthermore, when the numerology is configured to each user terminal, the same numerology can also be applied to user terminals to which different services are applied. In other words, a configuration can be adopted in which the numerology (communication parameter) when communication is performed in the communication system is configured to each user terminal and in the communication system, communication is performed with the same or different numerology (communication parameter) for each user terminal. Note that a plurality of aspects which will be described below may be practiced independently or can be practiced by being combined as necessary.

(First Aspect)

In a first aspect, a case will be described where the user terminal uses higher layer signaling so as to specify partial resources that can be used for communication. Note that, when the user terminal has already been connected to other cell (for example, the existing system), a configuration can be adopted in which the higher layer signaling is transmitted from the other cell to the user terminal. Further, although in the following description, a case where a frequency resource is configured as the partial resource for each numerology will be described, the present embodiment is not limited to this configuration.

The radio base station uses the higher layer signaling (such as RRC signaling or a broadcast signal) so as to notify the user terminal of information on the partial resources that the user terminal can use for communication. For example, the radio base station specifies a first partial resource for a user terminal which uses a first numerology (first communication parameter) and specifies a second partial resource for a user terminal which uses a second numerology (second communication parameter). The information on the partial resources can be configured so as to include at least one piece of resource information of the time, frequency, code and space resources.

Figure 7B:
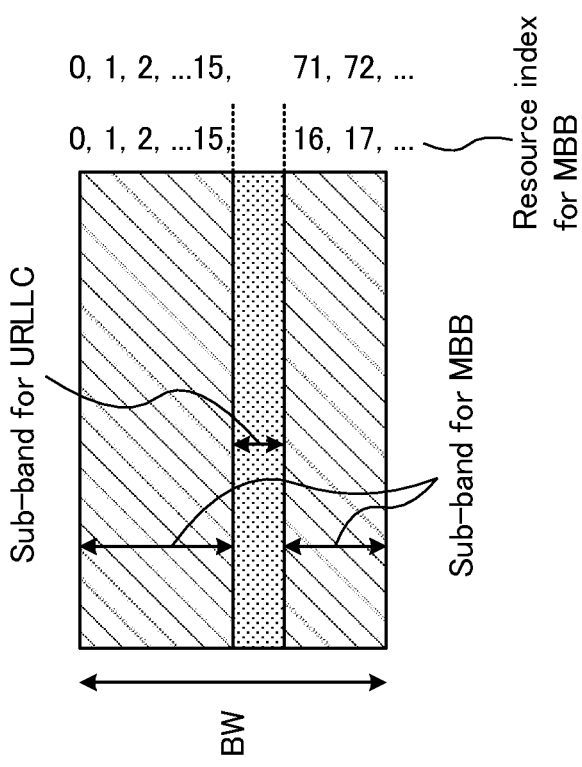
FIGS. 7A and 7B are diagrams showing an example of a configuration method of partial resources in the present embodiment.
Figure 7A:
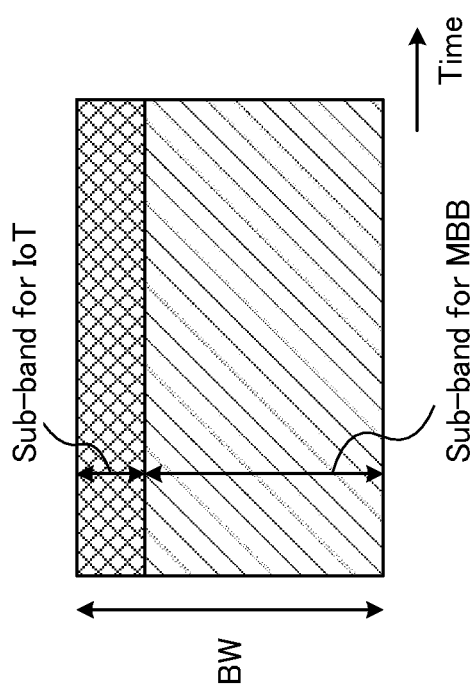

The user terminal performs reception processing (such as demodulation or decoding) on the control channel (control signal) and the data channel (downlink data) within the range of the partial resources specified by the higher layer signaling. It is possible to use the L1/L2 control channel (at least one of PCFICH, PHICH, PDCCH and EPDCCH) for the control channel which is transmitted with the partial resources. FIGS. 7A and 7B show an example of a case which configures the first partial resource and the second partial resource in a predetermined frequency band.

FIGS. 7A and 7B show a case of frequency-dividing the first partial resource (sub-band) configured for the first numerology and the second partial resource configured for the second numerology in the same time period (FDM). FIG. 7A shows a case of configuring the first numerology (first partial resource) for the IoT (or the user terminal using the IoT) and configuring the second numerology (second partial resource) for the MBB (or the user terminal using the MBB).

The user terminal for which the first partial resource is specified performs, in the first partial resource, the reception processing on the control channel and the data channel, and thereby can utilize the IoT service. Further, the user terminal for which the second partial resource is specified performs, in the second partial resource, the reception processing on the control channel and the data channel, and thereby can utilize the MBB service.

FIG. 7B shows a case of configuring the first numerology (first partial resource) for the URLLC (or the user terminal utilizing the URLLC) and configuring the second numerology (second partial resource) for the MBB (or the user terminal utilizing the MBB).

Furthermore, in the case of frequency-dividing the partial resources (FDM), discrete frequencies may be assigned to respective services (respective numerologies). FIG. 7B shows a case of assigning a discrete frequency to the second numerology (for example, MBB).

In the service (here, MBB) to which the discrete frequency is assigned, the assignment may be controlled such that resource indexes are continuous indexes across the discrete frequencies. For example, resource indexes 0 to 15 are assigned to one region of the second partial resource to which the discrete frequency is assigned. Further, it is possible to assign the resources from the resource index 16 to the other region of the second partial resource to be mapped with the first partial resource therebetween. Thereby, it is possible to perform scheduling with the L1/L2 control signal assuming that the resource indexes are virtually continuous, and thus to reduce the signaling overhead of the L1/L2 control signal necessary for specifying the resource indexes.

Alternatively, resource indexes may be independently assigned for each discrete frequency. For example, it is possible to assign the resource indexes 0 to 15 can be assigned to one region of the second partial resource to which the discrete frequencies are assigned, and to assign the resources from a new index (here, index 71) to the other region of the second partial resource. In this case, since scheduling is performed with the L1/L2 control signal based on common resource indexes, regardless of the place and the size of the partial resources to be configured, it is possible to perform scheduling with the L1/L2 control signal which includes a constant resource index specifying field regardless of the configuration of the partial resources. Consequently, blind decoding processing on the user terminal which receives the L1/L2 control signal can be shared regardless of the place and the size of the partial resources, and thus it is possible to reduce the circuit size of the user terminal.

Moreover, the partial resources may be configured equal to or may be configured different from each other between the time period where the control channel (for example, the L1/L2 control channel) is transmitted and received and the time period where the data channel (DL data and/or UL data) is transmitted and received. When the partial resources are configured different from each other, each of the pieces of information on the partial resources is notified to the user terminal by the higher layer signaling.

Furthermore, the radio base station uses the higher layer signaling so as to notify the user terminal of at least the partial resources for the control channel (for example, the L1/L2 control channel). The user terminal receives the L1/L2 control channel with the entire or part of the partial resources configured by the higher layer signaling.

Figure 8A:
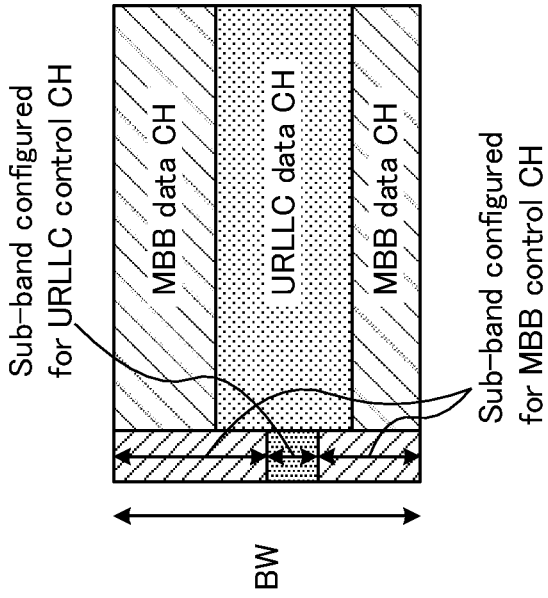
FIGS. 8A and 8B are diagrams showing another example of the configuration method of partial resources in the present embodiment.
Figure 8B:
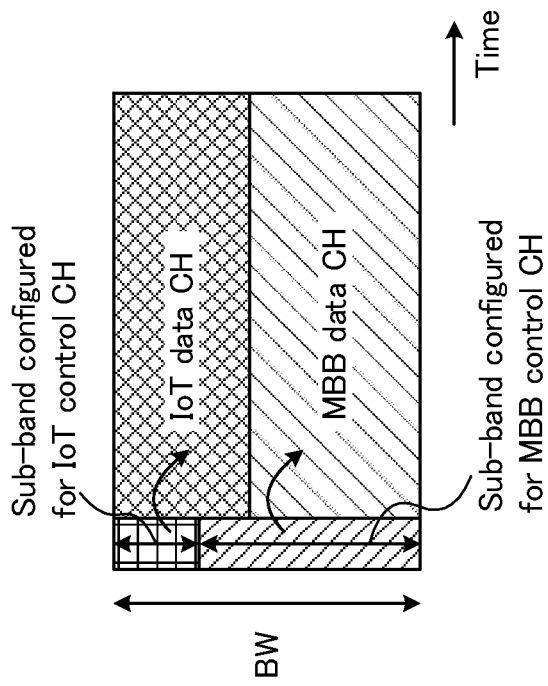

On the other hand, the user terminal can receive the DL data and/or the UL data not according to the partial resources of the higher layer signaling but based on the L1/L2 control channel for scheduling the DL data and the UL data. In this case, an assignment region (partial resources) for the L1/L2 control channel and an assignment region (partial resources) for the data channel can be configured individually (see FIGS. 8A and 8b). FIGS. 8A and 8b show a case of adopting a configuration in which a plurality of numerologies (services) is frequency division multiplexed into a predetermined frequency band (FDM) and resources assigned to the control channel and the data channel for the same service are different.

FIG. 8A shows a case of configuring the first numerology (first partial resource) for the IoT and configuring the second numerology (second partial resource) for the MBB. The user terminal receives the L1/L2 control channel from among the partial resources for the control channel specified by the higher layer signaling, and controls the transmission and reception of the data channel based on the L1/L2 control channel.

FIG. 8A shows a case of configuring the partial resources for the data channel wider in a frequency direction for the IoT than the partial resources for the control channel. Further, FIG. 8A shows a case of configuring the partial resources for the control channel wider in the frequency direction for the MBB than the partial resources for the data channel.

FIG. 8B shows a case of configuring the first numerology (first partial resource) for the URLLC and configuring the second numerology (second partial resource) for the MBB, and assigning the discrete frequency to the second numerology (for example, MBB). Further, FIG. 8B shows a case of configuring the partial resources for the data channel wider in the frequency direction for the URLLC than the partial resources for the control channel and configuring the partial resources for the control channel wider in the frequency direction for the MBB than the partial resources for the data channel.

As described above, it is possible to flexibly control assignment of each channel even in a case of simultaneously operating a plurality of numerologies (services) by making it possible to assign the partial resources for the control channel and the partial resources for the data channel with the different configuration.

<Operation Method>

An example of an operation method of the user terminal when the first aspect is applied will be described.

A network (for example, the radio base station) uses the higher layer signaling (the broadcast information or the RRC signaling) so as to notify the user terminal of the type of numerology and information on the partial resources available for communication by the numerology. For example, the radio base station notifies the user terminal which employs the first numerology (first communication parameter) of information on the first communication parameter (first numerology) and information on the partial resources for performing communication using the first communication parameter.

The user terminal performs the reception processing (for example, blind decoding) on the L1/L2 control channel within the notified partial resources. The L1/L2 control channel may be interleaved, distributed or spread over the entire resource region where the L1/L2 control channel can be mapped in the configured partial resources.

The user terminal, when having detected scheduling information destined to the user terminal (own terminal), controls DL data reception and/or UL data transmission based on the scheduling information. The resources which can transmit and receive the DL data/UL data may be limited within the configured partial resources or may be assignable to outside the partial resources configured in a range which can be instructed by the L1/L2 control channel.

Further, in a case where a change the partial resources of the type of numerology used for communication by the user terminal is instructed by the higher layer signaling, the user terminal changes the partial resources used for communication according to the change instruction requirement. The higher layer signaling may be included in a handover command. In this case, for each of the adjacent cells, different partial resources can be configured to the type of numerology, and thus a more flexible operation can be performed.

As described above, the higher layer signaling is used to notify the user terminal of the type of numerology (predetermined communication parameter) and the information on the partial resources used for communication, and thus it is possible to flexibly change the resources used for each numerology. Consequently, it is possible to enhance the frequency usage efficiency according to a communication environment and the like.

(Second Aspect)

In a second aspect, a case of specifying the partial resources which can be used for communication by the user terminal, by using a physical control channel (common control channel) common to a plurality of numerologies (partial resources or services).

The radio base station uses the common control channel so as to notify information on the partial resources which can be used for communication by the user terminal. For example, the radio base station specifies the first partial resource for the user terminal which uses the first numerology (first communication parameter), and specifies the second partial resource for the user terminal which uses the second numerology (second communication parameter). In this case, the radio base station can specify predetermined partial resources therefor by using the same common control channel for the individual user terminals.

The user terminal receives the common control channel for performing demodulation and decoding regardless of the numerology configured for itself, and determines the partial resources available for communication by itself, based on a combination of the value of the common control channel and the numerology configured for itself.

The common control channel may have a configuration to which the number of sub-carriers, the sub-carrier spacing and the symbol length that are predetermined are applied, regardless of the type of numerology configured to the user terminal. For example, the same communication parameters as in the existing system may be used to configure the common control channel or communication parameters corresponding to a predetermined numerology may be used to configure the common control channel. Furthermore, the type of numerology configured to the user terminal may be configured to the user terminal using the higher layer signaling or may be configured using the common control channel.

Figure 9A:
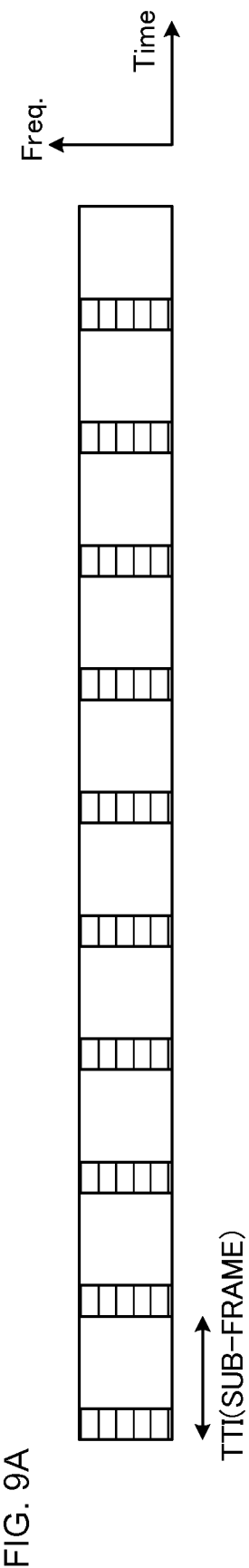
FIGS. 9A and 9B are diagrams showing another example of the configuration method of partial resources in the present embodiment.

The radio base station can transmit the common control channel to the user terminal every predetermined period (predetermined timing). As the predetermined timing, a normal TTI (sub-frame), the N times (N>1) the normal TTI, a TTI which is applied to any of a plurality of numerologies (or the N times the TTI), the radio frame or the like can be used. FIG. 9A shows a case of transmitting the common control channel every normal TTI (sub-frame).

The user terminal performs the reception processing on the control channel (control signal) and the data channel (downlink data) for a predetermined numerology within a range of the partial resources specified by the common control channel. It is possible to use the L1/L2 control channel as the control channel which is transmitted with the partial resources.

Figure 9C:
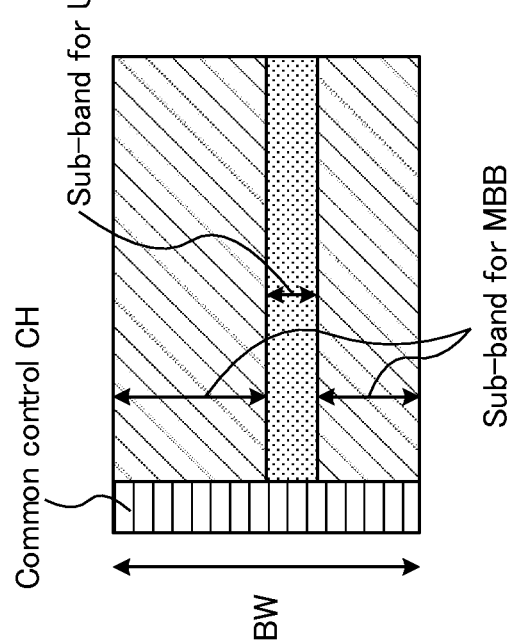
Figure 9B:
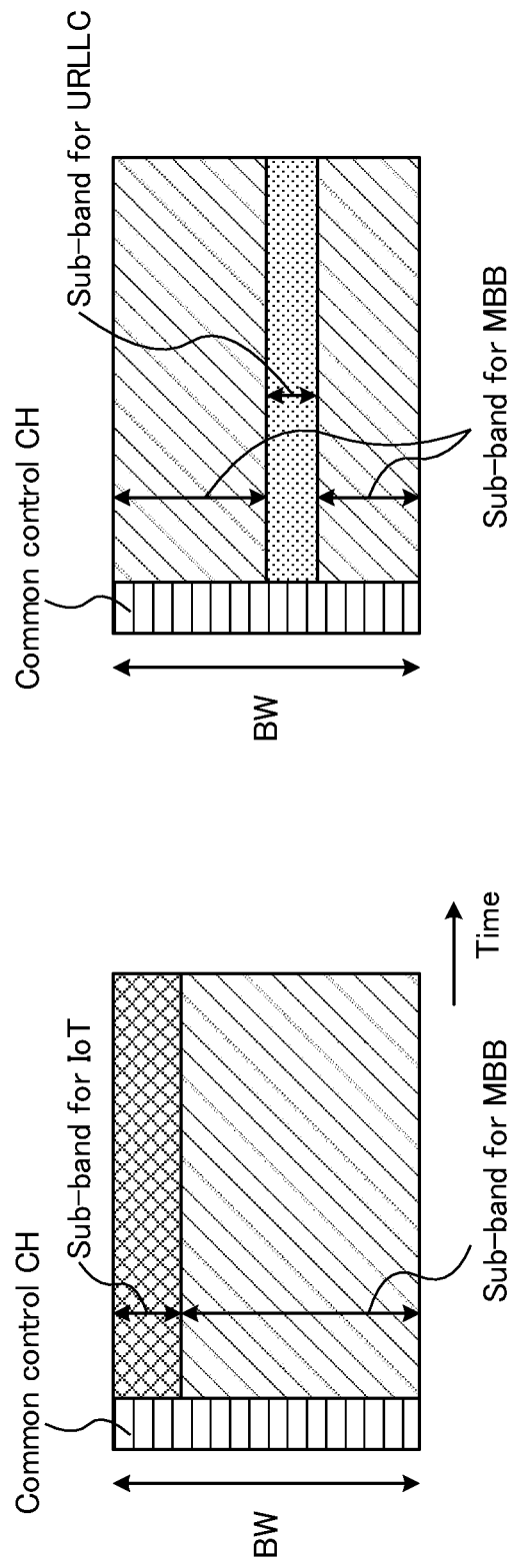

FIGS. 9B and 9C show a case of frequency-dividing the first partial resource (sub-band) configured for the first numerology and the second partial resource configured for the second numerologyin in the same time period (FDM). Further, the common control channel which specifies information on the first partial resource and the second partial resource is assigned. Although here, a case of time division multiplexing the first partial resource and the second partial resource in the common control channel (TDM) is described, an assignment method of the common control channel is not limited to this case.

FIG. 9B shows a case of configuring the first numerology (first partial resource) for the IoT (or the user terminal using the IoT) and configuring the second numerology (second partial resource) for the MBB (or the user terminal using the MBB). The common control channel specifies the partial resources (partial bands, bandwidth part) of the IoT and the MBB to the user terminal.

The user terminal for which the first partial resource is specified with the common control channel receives the control channel and the data channel in the first partial resource, and thereby can utilize the IoT service. Further, the user terminal for which the second partial resource is specified with the common control channel receives the control channel and the data channel in the second partial resource, and thereby can utilize the MBB service.

FIG. 9C shows a case of configuring the first numerology (first partial resource) for the URLLC (or a certain user terminal using the URLLC) and configuring the second numerology (second partial resource) for the MBB (or a certain user terminal using the MBB). In a case of frequency-dividing the partial resources (FDM), discrete frequencies may be assigned to the respective services (the respective numerologies). FIG. 9C shows a case of assigning a discrete frequency to the second numerology (for example, MBB).

The radio base station can use the common control channel to simultaneously specify the partial resources of the L1/L2 control channel and the partial resources of the data channel (DL data and/or UL data) which is scheduled with the L1/L2 control channel (see FIGS. 9B and 9C). Alternatively, a configuration may be adopted which notifies only the partial resources of the L1/L2 control channel to specify the assignment resources (partial resources) of the data channel using the L1/L2 control channel.

<Operation Method>

The user terminal first receives the common control channel so as to identify the partial resources which can be used for communication by the user terminal (own terminal). The user terminal, when it cannot receive the common control channel (or when it fails to perform decoding), may perform control so as not to perform the subsequent processing, for example, the demodulation and decoding processing on the L1/L2 control channel in the partial resources. Note that the user terminal may receive information on the type of numerology (the communication parameter to be used) with the common control channel or may receive it using the higher layer signaling.

After the reception of the common control channel, the user terminal performs the reception processing (for example, blind decoding) on the L1/L2 control channel within the partial resources specified by the common control channel. Specifically, the user terminal decodes scheduling information (for example, DCI) for performing the DL data reception or the UL data transmission dedicated to a user within the partial resources. The L1/L2 control channel (L1/L2 control signal) may be interleaved, distributed or spread over the entire resource region where the L1/L2 control signal can be mapped in the configured partial resources.

Figure 10:
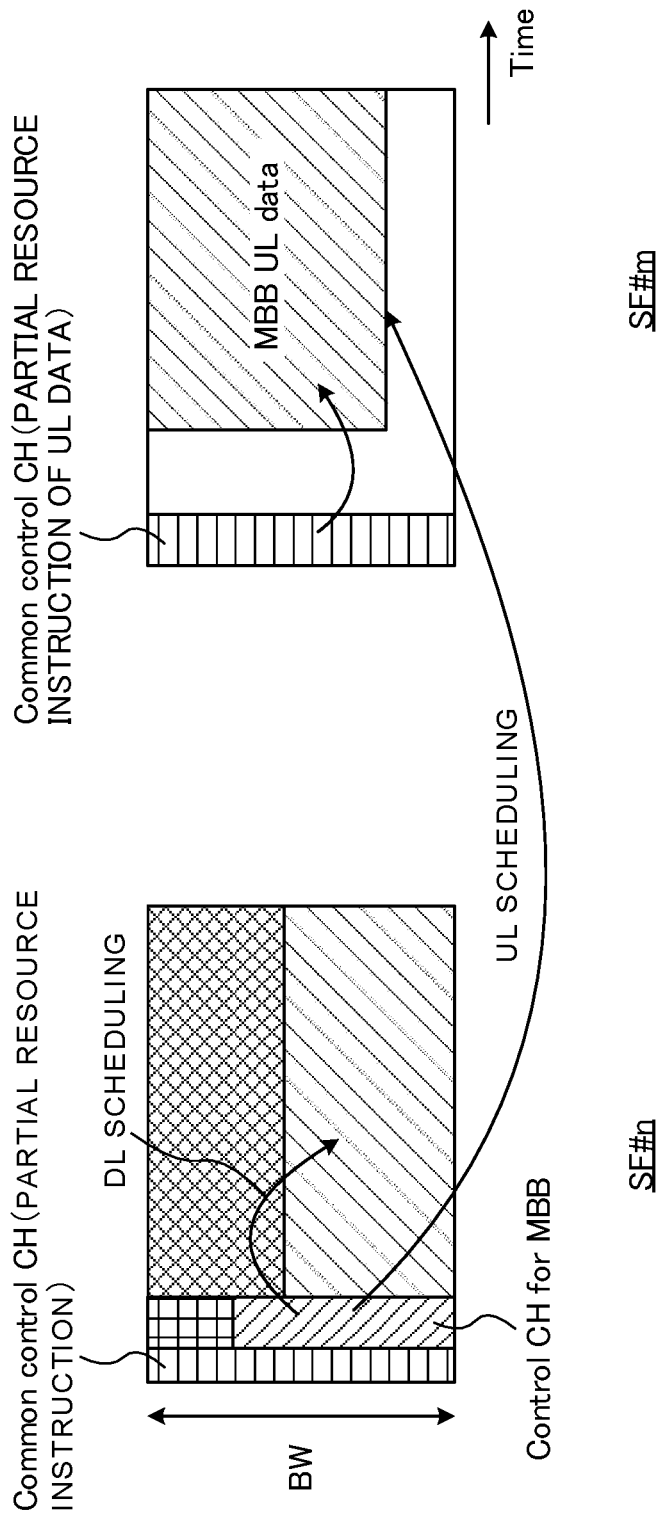
FIG. 10 is a diagram showing another example of the configuration method of partial resources in the present embodiment.

Then, the user terminal controls the transmission and reception of the DL data and/or the UL data based on the scheduling information included in the received L1/L2 control channel (for example, DCI) (see FIG. 10). FIG. 10 shows a case where in a certain sub-frame # n, the partial resources of the L1/L2 control channel are specified with the common control channel and the user terminal receives the L1/L2 control channel with the specified partial resources.

Further, when the received L1/L2 control channel indicates DL assignment, the user terminal can receive the DL data with the same sub-frame # n. Furthermore, when the received L1/L2 control channel indicates UL data transmission (UL grant), the user terminal can transmit the UL data with the sub-frame or the TTI (here, a sub-frame # m) after predetermined timing.

In this case, the user terminal can control the UL transmission in the sub-frame # m (for example, m=n+4) based on information on the partial resources of the UL data (here, the UL data for MBB) specified by the common control channel. Note that, when in the sub-frame # n, the partial resources of the UL data for MBB are also specified to the user terminal, the common control channel may not be provided in the sub-frame # m.

<Modification>

The common control channel can be configured to include information (the type of data transmission) indicating whether the data channel at the predetermined timing (for example, a predetermined TTI or a predetermined sub-frame) is the UL transmission or the DL transmission. In other words, the radio base station can use the common control channel to notify the user terminal of whether the data channel at the predetermined timing is the UL transmission or the DL transmission.

The user terminal can determine, from the common control channel, whether the predetermined timing (for example, the same sub-frame) is for DL data communication or for UL data communication and determine where the region of the partial resources for each numerology (service) is.

In this case, even when the UL data transmission is indicated with the sub-frame # n, the user terminal may control the UL transmission by indication of the common control channel at the transmission timing (for example, the sub-frame # m) of the UL data. For example, a configuration can be adopted which does not perform the UL transmission in the sub-frame # m, even when the UL data transmission is indicated with the sub-frame # n, unless the UL data transmission is indicated (allowed) with the common control channel in the sub-frame # m (see FIG. 11).

Figure 11:
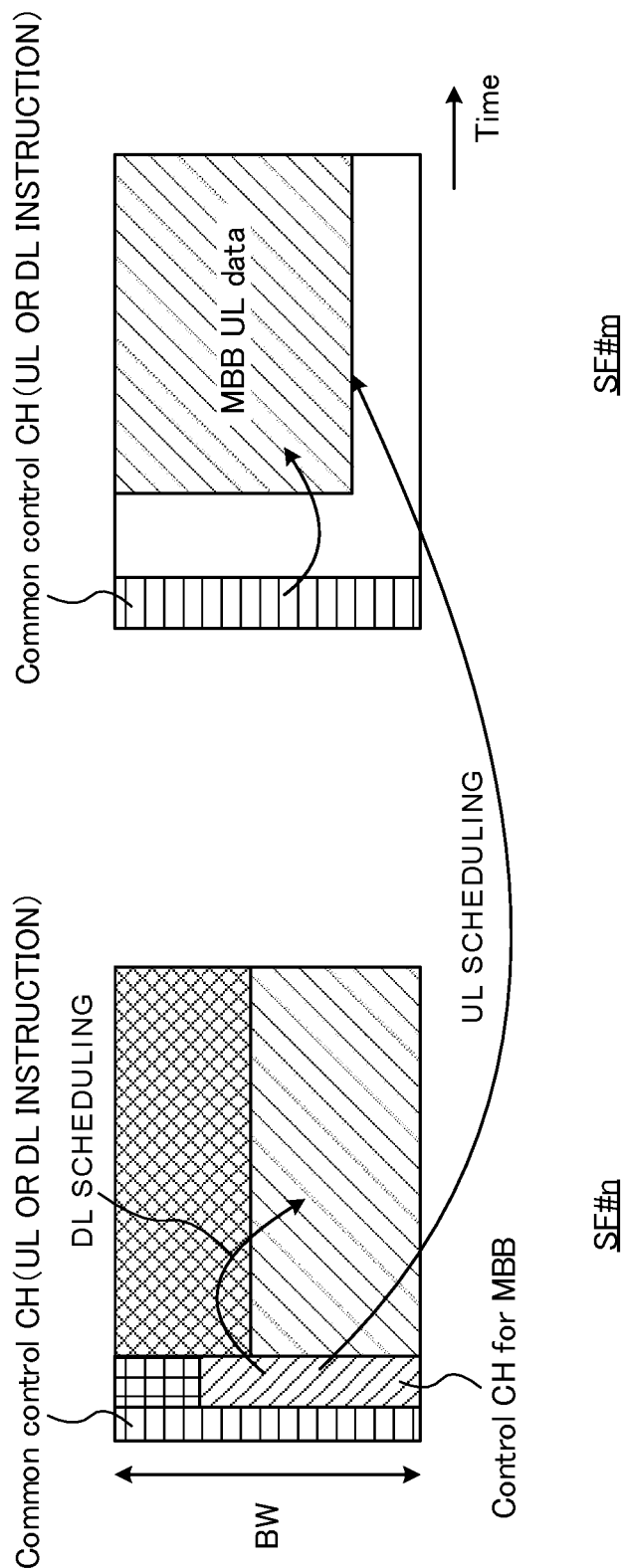
FIG. 11 is a diagram showing another example of the configuration method of partial resources in the present embodiment.

In FIG. 11, when the UL transmission is indicated with the common control channel of the sub-frame # m, the user terminal performs the UL data transmission based on scheduling information received with the sub-frame # n. On the other hand, when the DL transmission is indicated with the common control channel of the sub-frame # m, the user terminal can perform control so as not to perform (drop) the UL transmission.

Moreover, at the predetermined timing (for example, the sub-frame # m) at which the UL data transmission is indicated with the common control channel, the user terminal may perform control so as not to perform the reception processing of another DL control channel and/or DL data. Thereby, it is possible to reduce the processing burden of the user terminal.

(Third Aspect)

In a third aspect, a case will be described which uses a dedicated physical control channel (specific control channel) for each numerology (partial resource or service) to specify the partial resources that the user terminal can use for communication. Note that the specific control channel can be made common within the same numerology.

The radio base station uses the specific control channel so as to notify information on the partial resources that the user terminal can use for communication. For example, the radio base station uses, for the user terminal using a first numerology (first communication parameter), the specific control channel for the first numerology so as to specify the first partial resource. Further, the radio base station uses, for the user terminal using a second numerology (second communication parameter), the specific control channel for the second numerology so as to specify the second partial resource.

Furthermore, the radio base station can previously notify the user terminal of information on the resources (monitored by the user terminal) to which the specific control channel is assigned. For example, the radio base station sets the resource information on the specific control channel for each numerology using the higher layer signaling (for example, the broadcast information or the RRC signaling) to the user terminal. Here, the radio base station may notify the user terminal of the resource information on the specific control channels respectively corresponding to a plurality of numerologies or may selectively notify the user terminal of the resource information on the specific control channel corresponding to a predetermined numerology (for example, the numerology which is used by each user terminal).

The radio base station maps the specific control channels for the respective numerologies (respective services) onto the partial resources (for example, partial frequencies) which are configured by the higher layer signaling. Further, the radio base station specifies the partial resources of the L1/L2 control channel based on the specific control channel. The radio base station may specify, with the specific control channel, the partial resources of the data channel in addition to the partial resources of the L1/L2 control channel. Alternatively, the region to which the data channel is assigned may be determined based on the L1/L2 control channel. In this case, the radio base station can semi-statically change the resources of the specific physical control channel and can dynamically change the L1/L2 control channel and the data channel.

FIGS. 12A and 12B show a case of frequency-dividing the first partial resource (sub-band) configured for the first numerology and the second partial resource configured for the second numerology in the same time period (FDM). Furthermore, a first specific control channel which specifies the first partial resource and a second specific control channel which specifies the second partial resource are assigned. Although here, described is a case of frequency division multiplexing the specific control channel corresponding to each numerology (FDM), an assignment method of the specific control channel is not limited to this case.

FIG. 12A shows a case of configuring the first numerology (first partial resource) for the IoT (or the user terminal using the IoT) and configuring the second numerology (second partial resource) for the MBB (or the user terminal using the MBB). First specific control information specifies the partial resource (first partial resource) for the IoT to the user terminal, and second specific control information specifies the partial resource (second partial resource) for the MBB to the user terminal. Note that FIG. 12A shows a case where a specific channel for the URLLC to which the data channel is not assigned is set blank.

The user terminal to which the first partial resource is specified with the first specific control channel receives the control channel and the data channel in the first partial resource, and thereby can utilize the IoT service. Further, the user terminal to which the second partial resource is specified with the second specific control channel receives the control channel and the data channel in the second partial resource, and thereby can utilize the MBB service.

FIG. 12B shows a case of configuring the first numerology (first partial resource) for the URLLC (or a certain user terminal using the URLLC) and configuring the second numerology (second partial resource) for the MBB (or a certain user terminal using the MBB). In a case of frequency division multiplexing the partial resources (FDM), discrete frequencies may be assigned to the respective services (the respective numerologies). Note that FIG. 12B shows a case where a specific channel for the IoT to which the data channel is not assigned is set blank.

The radio base station can use the specific control channel to simultaneously specify the partial resources of the L1/L2 control channel for the respective numerologies and the partial resources of the data channel (DL data and/or UL data) which is scheduled with the L1/L2 control channel. Alternatively, a configuration may be adopted which notifies only the partial resources of the L1/L2 control channel to specify the assignment resources (partial resources) of the data channel using the L1/L2 control channel.

<Modification>

Figure 13:
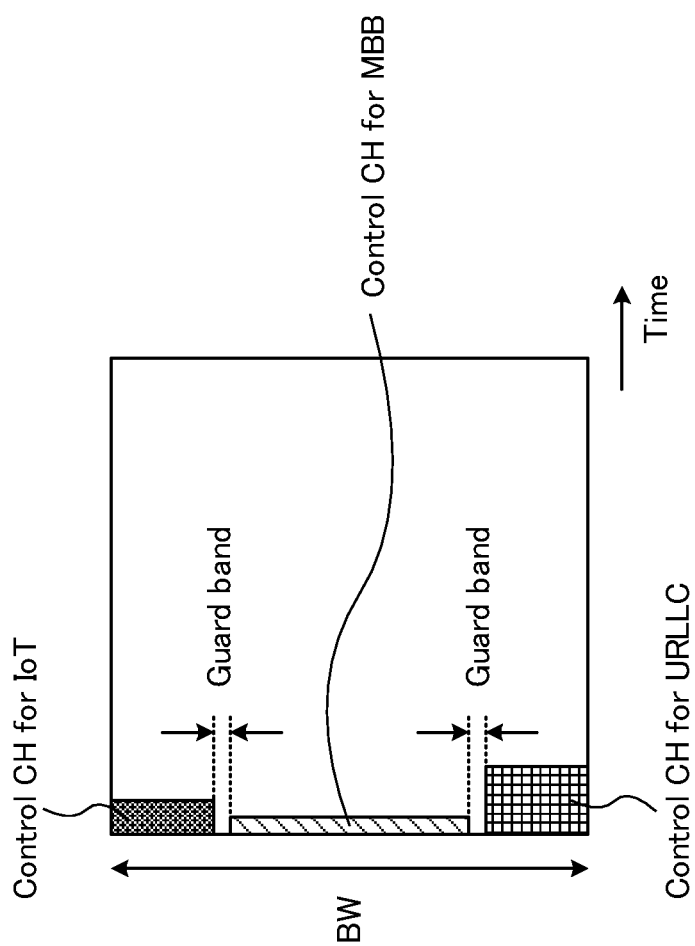
FIG. 13 is a diagram showing another example of the configuration method of partial resources in the present embodiment.

It is possible to use a control channel which specifies the partial resources for each user group (for example, a user group to which the same numerology is applied) as the specific control channel for specifying the partial resources. When the numerologies configured for respective user groups are different from each other, the specific control channel may have a different frame configuration (for example, a different sub-carrier spacing, a different symbol length and a different TTI length) for each user group (see FIG. 13).

A configuration (such as a sub-carrier spacing, a symbol length and a TTI length) which is applied to each specific control channel can be the same configuration as the control channel (for example, the L1/L2 control channel) for transmitting scheduling information or the data channel. In this case, a configuration may be adopted which provides a guard band between the specific control channels of the numerologies (services) where the sub-carrier spacing and the symbol length are different. Thereby, it is possible to suppress interference which occurs between the specific control channels even when the symbol length and the like are different between a plurality of specific control channels.

(Radio Communication System)

The configuration of a radio communication system according to an embodiment of the present invention will be described below. In the radio communication system, the radio communication method according to each of the aspects described above is applied. Note that the radio communication methods according to the respective aspects may be applied singly or may be applied in combination.

Figure 14:
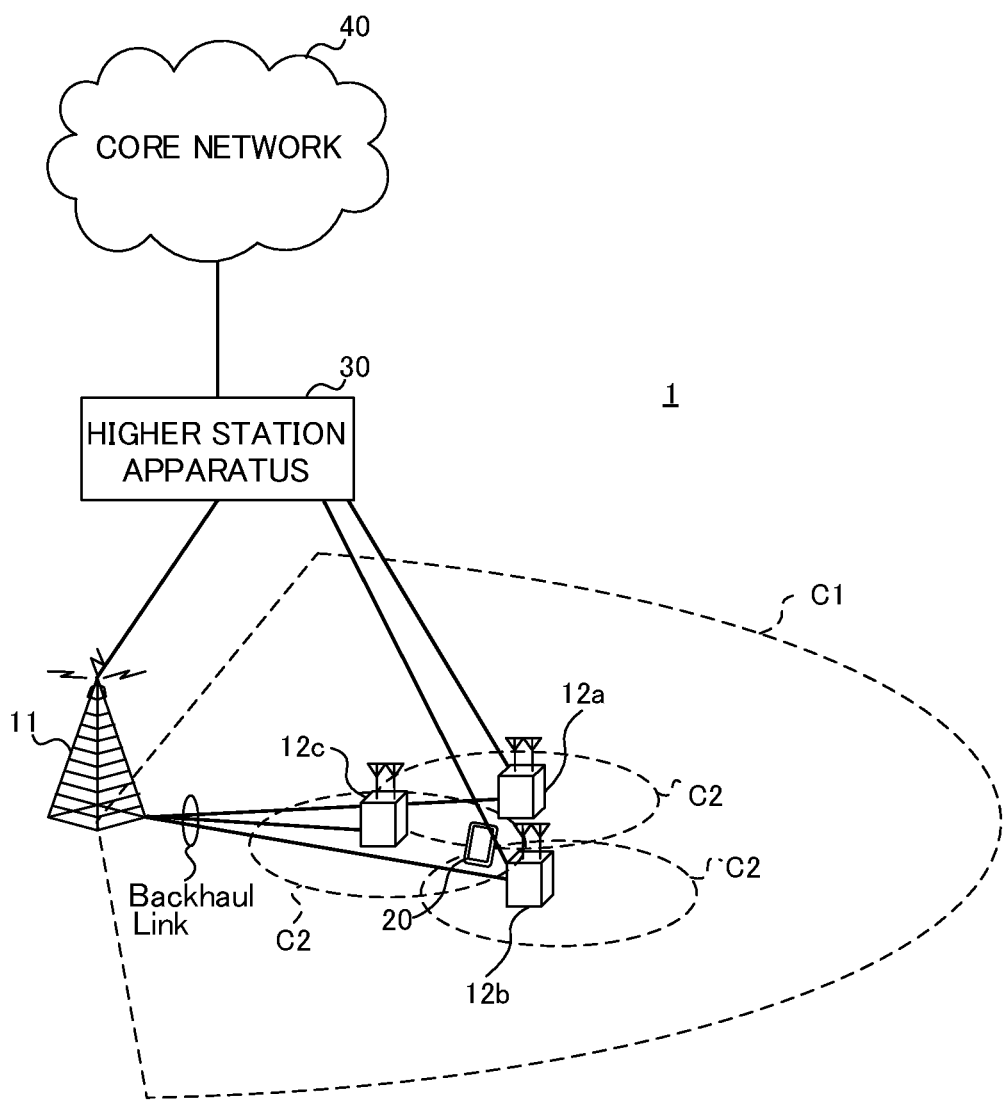
FIG. 14 is a diagram showing an example of a schematic configuration of a radio communication system according to the present embodiment.

FIG. 14 is a diagram showing an example of the schematic configuration of the radio communication system according to the embodiment of the present invention. In a radio communication system 1, Carrier Aggregation (CA) in which a plurality of basic frequency blocks (component carriers) where a system bandwidth (for example, 20 MHz) of the LTE system is used as one unit is aggregated, and/or Dual Connectivity (DC) can be applied. Note that the radio communication system 1 may be called SUPER 3G, LTE-A (LTE-Advanced), IMT-Advanced, 4G, 5G, FRA (Future Radio Access) or the like.

The radio communication system 1 shown in FIG. 14 includes a radio base station 11 which forms a macrocell C1 and radio base stations 12a to 12c each of which is disposed within the macrocell C1 and forms a small cell C2 narrower than the macrocell C1. Further, a user terminal 20 is arranged in the macrocell C1 and each of the small cells C2. The numerologies which are different between the cells may be applied. Note that the numerology refers to the design of a signal in a certain RAT or a set of communication parameters which characterize the design of the RAT.

The user terminal 20 can be connected to both the radio base station 11 and the radio base station 12. The user terminal 20 is assumed to simultaneously use, by CA or DC, the macrocell C1 and the small cell C2 using different frequencies. Further, the user terminal 20 can employ CA or DC using a plurality of cells (CCs) (for example, six or more CCs). Furthermore, the user terminal can use, as a plurality of cells, a licensed band CC and an unlicensed band CC. Note that a configuration can be adopted which includes a TDD carrier that applies a shortened TTI to any of the plurality of cells.

Between the user terminal 20 and the radio base station 11, it is possible to perform communication using a carrier (which is called an existing carrier, a legacy carrier or the like) which has a relatively low frequency band (for example, 2 GHz) and a narrow bandwidth. On the other hand, between the user terminal 20 and the radio base station 12, a carrier which has a relatively high frequency band (for example, 3.5 GHz or 5 GHz) and a wide bandwidth may be used or the same carrier as the carrier between the user terminal 20 and the radio base station 11 may be used. Note that the configuration of the frequency band used by each of the radio base stations is not limited to the configurations described above.

Between the radio base station 11 and the radio base station 12 (or between the two radio base stations 12), a wired connection (for example, an optical fiber conforming to CPRI (Common Public Radio Interface) or an X2 interface) or a radio connection can be provided.

The radio base station 11 and each of the radio base stations 12 are respectively connected to a higher station apparatus 30 and are connected to a core network 40 through the higher station apparatus 30. Note that, the higher station apparatus 30 includes, but not limited to, for example, an access gateway device, a radio network controller (RNC), a mobility management entity (MME) and the like. Further, each of the radio base stations 12 may be connected to the higher station apparatus 30 through the radio base station 11.

Note that the radio base station 11 is a radio base station which has a relatively wide coverage, and may be called a macrobase station, an aggregation node, eNB (eNodeB), a transmission/reception point or the like. Further, the radio base station 12 is a radio base station which has a local coverage, and may be called a small base station, a microbase station, a picobase station, a femtobase station, HeNB (Home eNodeB), RRH (Remote Radio Head), a transmission/reception point or the like. Hereinafter, when the radio base stations 11 and 12 are not distinguished, they are collectively referred to as radio base stations 10.

Each user terminal 20 is a terminal which corresponds to various types of communication schemes, such as LTE and LTE-A, and may include not only a mobile communication terminal but also a fixed communication terminal.

In the radio communication system 1, as a radio access scheme, OFDMA (orthogonal frequency division multiple access) is applied to downlink, and the SC-FDMA (single carrier frequency division multiple access) is applied to uplink. The OFDMA is a multicarrier transmission scheme in which a frequency band is divided into a plurality of narrow frequency bands (subcarriers), and data is mapped onto the subcarriers to perform communication. The SC-FDMA is a single carrier transmission scheme in which a system bandwidth is divided, for each terminal, into bands formed with one or continuous resource blocks, and a plurality of terminals uses different bands to reduce interference between the terminals. Note that the uplink and downlink radio access schemes are not limited to combinations thereof, and OFDMA may be used in the uplink.

In the radio communication system 1, as the downlink channel, a downlink shared channel (PDSCH: Physical Downlink Shared Channel) which is shared by the user terminals 20, a broadcast channel (PBCH: Physical Broadcast Channel), a downlink L1/L2 control channel and the like are used. With the PDSCH, user data, higher layer control information, SIB (System Information Block) and the like are transmitted. Further, with the PBCH, MIB (Master Information Block) is transmitted.

The downlink L1/L2 control channel includes downlink control channels (PDCCH (Physical Downlink Control Channel), EPDCCH (Enhanced Physical Downlink Control Channel)), PCFICH (Physical Control Format Indicator Channel), PHICH (Physical Hybrid-ARQ Indicator Channel) and the like. With the PDCCH, downlink control information (DCI) including scheduling information on the PDSCH and the PUSCH and the like are transmitted. With the PCFICH, the number of OFDM symbols used for the PDCCH is transmitted. With the PHICH, receipt confirmation information (ACK/NACK) of HARQ for the PUSCH is transmitted. The EPDCCH is frequency division multiplexed with the PDSCH (downlink shared data channel), and is used for the transmission of DCI and the like as with the PDCCH.

In the radio communication system 1, as an uplink channel, an uplink shared channel (PUSCH: Physical Uplink Shared Channel) shared by the user terminals 20, an uplink control channel (PUCCH: Physical Uplink Control Channel), a random access channel (PRACH: Physical Random Access Channel) and the like are used. With the PUSCH, the user data and the higher layer control information are transmitted. With the PUSCH or the PUCCH, uplink control information (UCI) which includes at least one of the receipt confirmation information (ACK/NACK), radio quality information (CQI) and the like is transmitted. With the PRACH, a random access preamble for establishing connection to the cell is transmitted.

<Radio Base Station>

Figure 15:
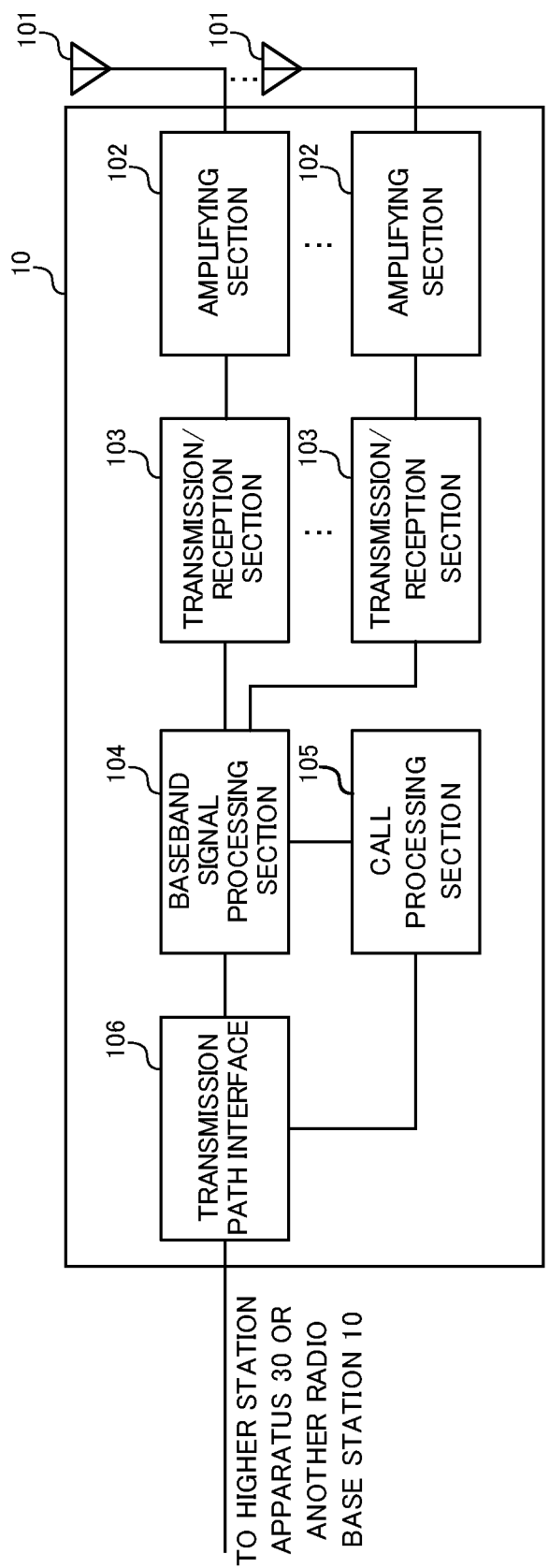
FIG. 15 is a diagram showing an example of an overall configuration of a radio base station according to the present embodiment.

FIG. 15 is a diagram showing an example of the entire configuration of the radio base station according to the embodiment of the present invention. The radio base station 10 includes a plurality of transmission/reception antennas 101, amplifying sections 102, transmission/reception sections 103, a baseband signal processing section 104, a call processing section 105 and a transmission path interface 106. Note that the transmission/reception section 103 includes a transmission section and a reception section.

User data to be transmitted to the user terminal 20 from the radio base station 10 on downlink is input to the baseband signal processing section 104 from the higher station apparatus 30 through the transmission path interface 106.

The baseband signal processing section 104 performs, on user data, transmission processing, such as processing of a PDCP (Packet Data Convergence Protocol) layer, segmentation and concatenation of user data, transmission processing of a RLC layer such as RLC (Radio Link Control) retransmission control, MAC (Medium Access Control) retransmission control (for example, transmission processing of HARQ (Hybrid Automatic Repeat Request)), scheduling, transmission format selection, channel coding, inverse fast Fourier transform (IFFT) processing and precoding processing so as to transfer the user data to the transmission/reception sections 103. Furthermore, the baseband signal processing section 104 performs, also on downlink control signal, transmission processing, such as channel coding and inverse fast Fourier transform so as to transfer the downlink control signal to the transmission/reception sections 103.

The transmission/reception section 103 converts a baseband signal which is precoded and output from the baseband signal processing section 104 for each antenna into a signal with a radio frequency band and transmits the signal. The radio frequency signal frequency-converted in the transmission/reception section 103 is amplified by the amplifying section 102 and is transmitted from the transmission/reception antenna 101.

The transmission/reception section (transmission section) 103 transmits information on the partial resources used for communication by the user terminal. For example, the transmission/reception section (transmission section) 103 can use higher layer signaling (broadcast information or RRC signaling) to notify the user terminal of the type of numerology and information on the partial resources which can be used for communication with the numerology. The higher layer signaling may be included in a handover command. Further, the transmission/reception section (transmission section) 103 may transmit the information on the partial resources with the common control channel which is common to a plurality of communication parameters or the specific control channel which is dedicated to the communication parameter. The transmission/reception section 103 can be configured from a transmitter/receiver, a transmission/reception circuit or a transmission/reception device which is described based on common recognition in the technical field according to the present invention. Note that the transmission/reception section 103 may be formed as an integral transmission/reception section or may be formed with a transmission section and a reception section.

On the other hand, with respect to uplink signals, the radio frequency signals which are received by the transmission/reception antennas 101 are amplified in the amplifying sections 102. The transmission/reception section 103 receives the uplink signal amplified in the amplifying section 102. The transmission/reception section 103 frequency-converts the received signal into a baseband signal, and outputs the baseband signal to the baseband signal processing section 104.

The baseband signal processing section 104 performs, on user data included in the input uplink signal, fast Fourier transform (FET) processing, inverse discrete Fourier transform (IDFT) processing, error correction decoding, reception processing of MAC retransmission control and reception processing of RLC layer and PDCP layer so as to transmit the user data to the higher station apparatus 30 through the transmission path interface 106. The call processing section 105 performs call processing, such as the configuration and release of a communication channel, the state management of the radio base station 10 and the management of the radio resources.

The transmission path interface 106 transmits and receives signals to and from the higher station apparatus 30 through a predetermined interface. Further, the transmission path interface 106 may transmit and receive (backhaul signaling) signals to and from an adjacent radio base station 10 through an inter-base station interface (for example, an optical fiber conforming to CPRI (Common Public Radio Interface) or an X2 interface).

Figure 16:
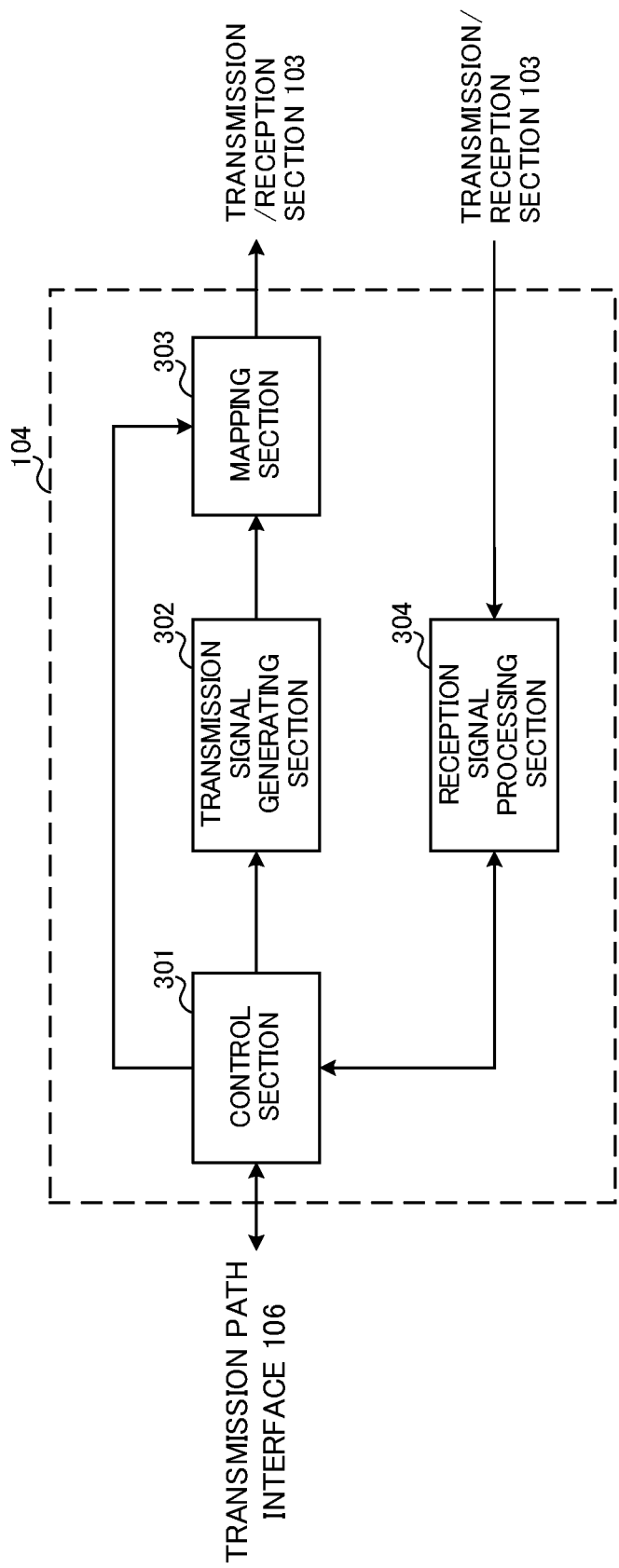
FIG. 16 is a diagram showing an example of a function configuration of the radio base station according to the present embodiment.

FIG. 16 is a diagram showing an example of the function configuration of the radio base station according to the present embodiment. Note that FIG. 16 mainly shows the function blocks of characteristic portions in the present embodiment, and the radio base station 10 is assumed to include the other function blocks necessary for radio communication. As shown in FIG. 16, the baseband signal processing section 104 includes a control section (scheduler) 301, a transmission signal generation section (generation section) 302, a mapping section 303 and a received signal processing section 304.

The control section (scheduler) 301 controls scheduling (for example, resource assignment) on a downlink data signal transmitted with the PDSCH and a downlink control signal transmitted with the PDCCH and/or the EPDCCH. Further, the control section (scheduler) 301 also controls scheduling of system information, a synchronization signal, paging information, a CRS (Cell-specific Reference Signal), a CSI-RS (Channel State Information Reference Signal) and the like. Furthermore, the control section (scheduler) 301 controls scheduling of an uplink reference signal, an uplink data signal transmitted with the PUSCH, an uplink control signal transmitted with the PUCCH and/or the PUSCH and the like.

The control section 301 can control transmission and reception in the transmission/reception section 103. For example, the control section 301 can control the assignment of the control channel and/or the data channel to the partial resources. The control section 301 can be formed as a controller, a control circuit or a control device which is described based on common recognition in the technical field according to the present invention.

The transmission signal generation section 302 generates a DL signal (including a downlink data signal and a downlink control signal) based on an instruction from the control section 301, and outputs it to the mapping section 303. Specifically, the transmission signal generation section 302 generates a downlink data signal (PDSCH) including user data and outputs it to the mapping section 303. Further, the transmission signal generation section 302 generates a downlink control signal (PDCCH/EPDCCH) including DCI (UL grant) and outputs it to the mapping section 303. Furthermore, the transmission signal generation section 302 generates a downlink reference signal, such as the CRS and the CSI-RS and outputs it to the mapping section 303.

The mapping section 303 maps, based on an instruction from the control section 301, the DL signal generated in the transmission signal generation section 302 onto a predetermined radio resource, and outputs it to the transmission/reception sections 103. The mapping section 303 can be formed as a mapper, a mapping circuit or a mapping device which is described based on common recognition in the technical field according to the present invention.

The received signal processing section 304 performs reception processing (for example, demapping, demodulation and decoding) on a UL signal (such as HARQ-ACK or PUSCH) transmitted from the user terminal 20. The processing result is output to the control section 301. The received signal processing section 304 can be formed with a signal processor, a signal processing circuit or a signal processing device as well as a measure, a measuring circuit or a measuring device which are described based on common recognition in the technical field according to the present invention.

<User Terminal>

Figure 17:
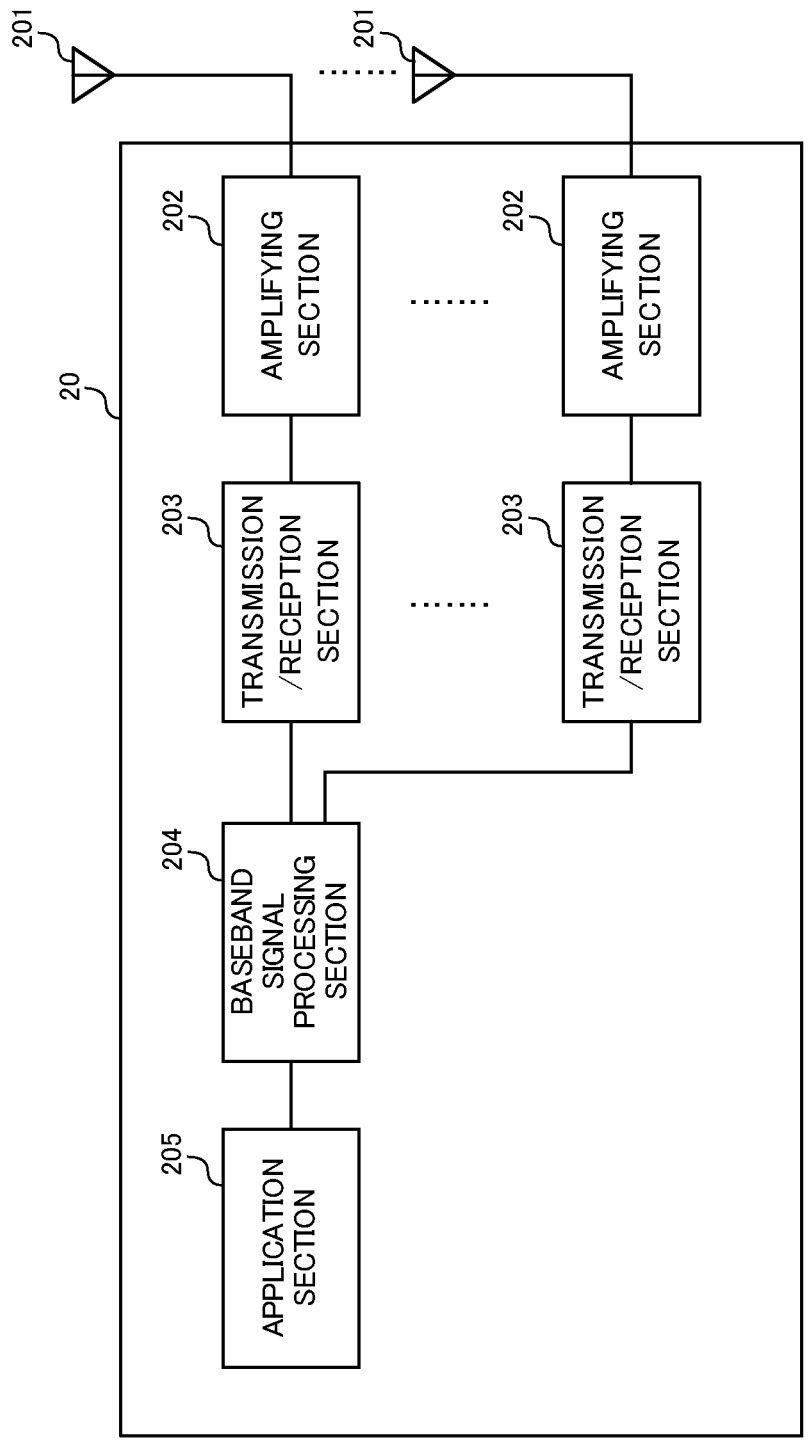
FIG. 17 is a diagram showing an example of an overall configuration of a user terminal according to the present embodiment.

FIG. 17 is a diagram showing an example of the entire configuration of the user terminal according to the embodiment of the present invention. The user terminal 20 includes a plurality of transmission/reception antennas 201 for MIMO transmission, amplifying sections 202, transmission/reception sections 203, a baseband signal processing section 204 and an application section 205. Note that the transmission/reception section 203 may be formed with a transmission section and a reception section.

The radio frequency signals received by the plurality of transmission/reception antennas 201 are amplified in the amplifying sections 202, respectively. The transmission/reception sections 203 receive the downlink signals amplified in the amplifying sections 202. The transmission/reception section 203 frequency-converts the received signal into the baseband signal and outputs it to the baseband signal processing section 204.

The transmission/reception section (reception section) 203 receives the DL signal (for example, the L1/L2 control channel) transmitted from the radio base station. For example, the transmission/reception section (reception section) 203 transmits information on the partial resources used for communication. Further, the transmission/reception section (reception section) 203 can use higher layer signaling (broadcast information or RRC signaling) to receive the type of numerology and the information on the partial resources which can be used for communication with the numerology (see FIGS. 7 and 8).

Furthermore, the transmission/reception section (reception section) 203 may receive the information on the partial resources with the common control channel which is common to a plurality of communication parameters or the specific control channel which is dedicated to the communication parameter (see FIGS. 9 and 12). The common control channel includes information on the partial resources used for reception of the L1/L2 control channel in a predetermined communication parameter or information on the partial resources used for reception of the L1/L2 control channel and the data channel (see FIG. 10). Moreover, the common control channel may include information as to whether communication at predetermined timing is DL data communication or UL data communication (see FIG. 11). Furthermore, the configuration of a radio frame which is different for each communication parameter may be applied to the specific control channel (see FIG. 13).

The transmission/reception section 203 can be formed as a transmitter/receiver, a transmission/reception circuit or a transmission/reception device which is described based on common recognition in the technical field according to the present invention.

The baseband signal processing section 204 performs FFT processing, error correction decoding, the reception processing of retransmission control and the like on the input baseband signal. The downlink user data is transmitted to the application section 205. The application section 205 performs, for example, processing on layers higher than a physical layer and a MAC layer. Further, the broadcast information of the downlink data is also transmitted to the application section 205.

On the other hand, the uplink user data is input from the application section 205 to the baseband signal processing section 204. The baseband signal processing section 204 performs the transmission processing of retransmission control (for example, the transmission processing of HARQ), channel coding, precoding, discrete Fourier transform (DFT) processing, IFFT processing and the like, and transmits the uplink user data to each of the transmission/reception sections 203. The transmission/reception section 203 converts the baseband signal output from the baseband signal processing section 204 into a signal with a radio frequency band and transmits the signal. The radio frequency signal frequency-converted in the transmission/reception section 203 is amplified in the amplifying section 202 and is transmitted from the transmission/reception antenna 201.

Figure 18:
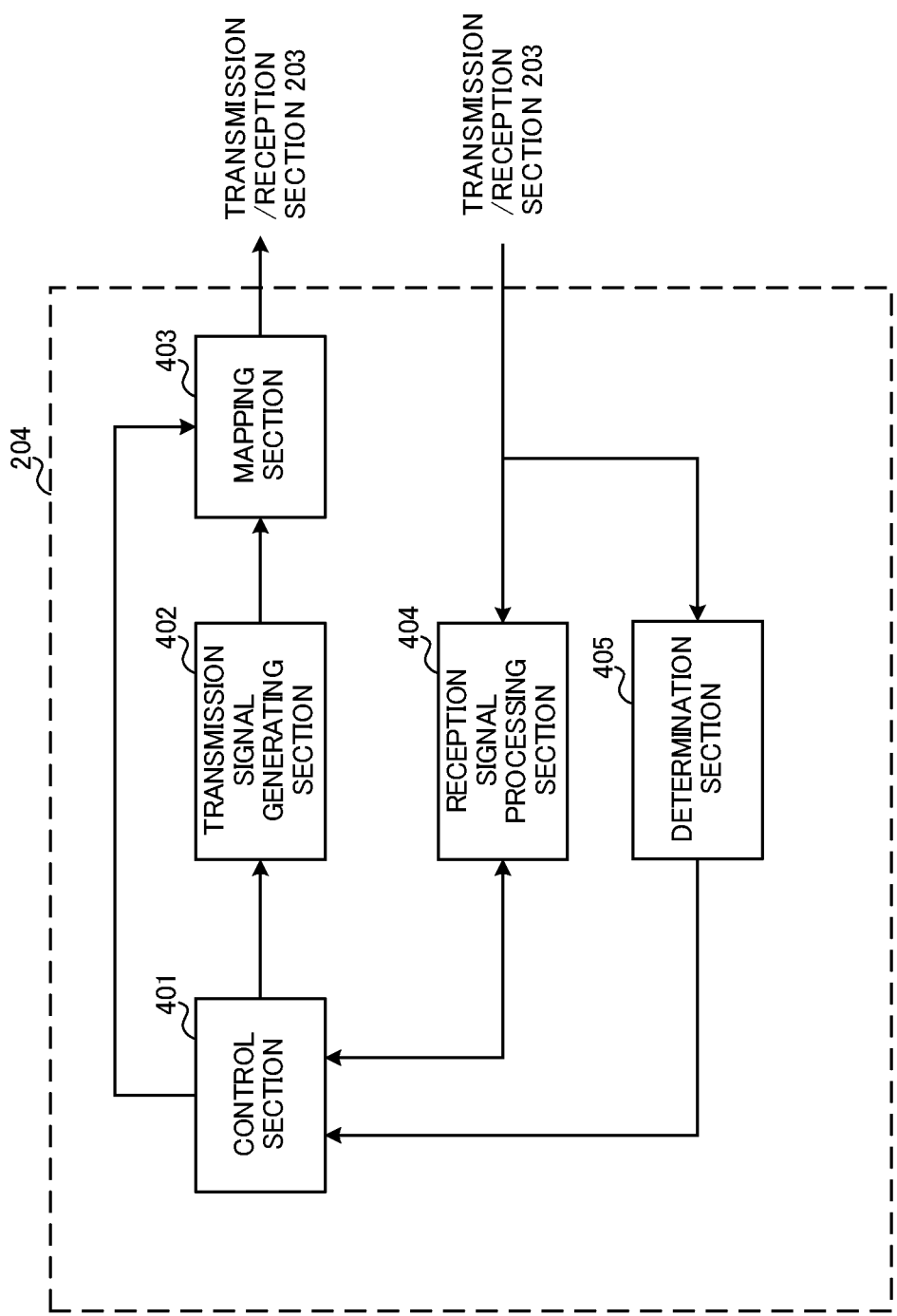
FIG. 18 is a diagram showing an example of a function configuration of the user terminal according to the present embodiment.

FIG. 18 is a diagram showing an example of the function configuration of the user terminal according to the present embodiment. Note that FIG. 18 mainly shows the function blocks of characteristic portions in the present embodiment, and the user terminal 20 is assumed to also include the other function blocks necessary for radio communication. As shown in FIG. 18, the baseband signal processing section 204 included in the user terminal 20 includes a control section 401, a transmission signal generation section 402, a mapping section 403, a received signal processing section 404 and a determination section 405.

The control section 401 acquires, from the received signal processing section 404, the downlink control signal (signal transmitted with the PDCCH/EPDCCH) transmitted from the radio base station 10 and the downlink data signal (signal transmitted with the PDSCH). The control section 401 controls the generation of the uplink control signal (for example, the receipt confirmation information signal (HARQ-ACK)) and the uplink data signal, based on the downlink control signal, a result of determining whether or not it is necessary to perform retransmission control on the downlink data signal and the like. Specifically, the control section 401 can perform control of the transmission signal generation section 402, the mapping section 403 and the received signal processing section 404.

The control section 401 uses the predetermined communication parameter so as to control the UL transmission and/or the DL reception, based on the information on the partial resources configured from the radio base station. For example, the control section 401 controls the reception of the L1/L2 control channel and the downlink data channel in the range of the partial resources (see FIG. 7). Alternatively, the control section 401 controls the reception of the L1/L2 control channel in the range of the partial resources, and controls the reception of the downlink data channel based on the received L1/L2 control channel (see FIG. 8). The control section 401 can be formed as a controller, a control circuit and a control device which is described based on common recognition in the technical field according to the present invention.

The transmission signal generation section 402 generates the UL signal and outputs it to the mapping section 403, based on an instruction from the control section 401. For example, the transmission signal generation section 402 generates the uplink control signal, such as the receipt confirmation signal (HARQ-ACK) or the channel state information (CSI), based on an instruction from the control section 401.

Further, the transmission signal generation section 402 generates the uplink data signal based on an instruction from the control section 401. For example, when the downlink control signal notified from the radio base station 10 includes the UL grant, the transmission signal generation section 402 is instructed by the control section 401 to generate the uplink data signal. The transmission signal generation section 402 can be formed as a signal generator, a signal generation circuit or a signal generation circuit device which is described based on common recognition in the technical field according to the present invention.

The mapping section 403 maps, based on an instruction from the control section 401, the uplink signal (the uplink control signal and/or the uplink data) generated in the transmission signal generation section 402 onto the radio resource, and outputs it to the transmission/reception section 203. The mapping section 403 can be formed as a mapper, a mapping circuit or a mapping device which is described based on common recognition in the technical field according to the present invention.

The received signal processing section 404 performs the reception processing (for example, demapping, demodulation and decoding) on a DL signal (for example, the downlink control signal transmitted from the radio base station or the downlink data signal transmitted with the PDSCH). The received signal processing section 404 outputs the information received from the radio base station 10 to the control section 401 and the determination section 405. The received signal processing section 404 outputs, for example, the broadcast information, the system information, the RRC signaling, and the DCI to the control section 401.

The received signal processing section 404 can be formed with a signal processor, a signal processing circuit or a signal processing device as well as a measure, a measuring circuit or a measuring device which are described based on common recognition in the technical field according to the present invention. Further, the received signal processing section 404 can form the reception section according to the present invention.

The determination section 405 performs a retransmission control determination (ACK/NACK) and outputs the result of the determination to the control section 401, based on the result of the decoding by the received signal processing section 404. When downlink signals (PDSCH) from a plurality of CCs (for example, six or more CCs) are transmitted, the retransmission control determination (ACK/NACK) is performed on each of the CCs, and thus the results thereof can be output to the control section 401. The determination section 405 can be formed with a determination circuit or a determination device which is described based on common recognition in the technical field according to the present invention.

(Hardware Configuration)

Note that the block diagrams which are used for the description of the embodiment discussed above show the blocks of functional units. These function blocks (constitutional sections) are realized by an arbitrary combination of hardware and/or software. Moreover, a measure for realizing each of the function blocks is not particularly limited. In other words, each of the function blocks may be realized by one physically coupled device or may be realized by two or more physically separated devices which are wired or wirelessly connected.

Figure 19:
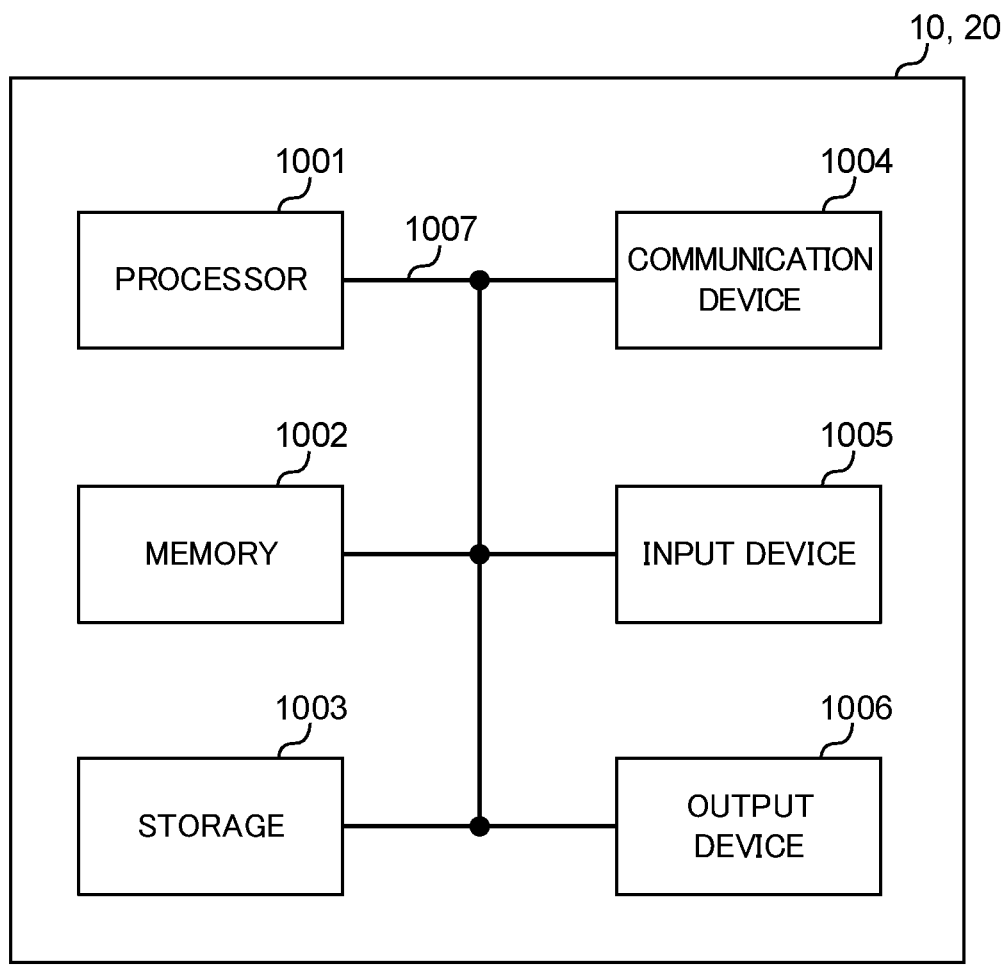
FIG. 19 is a diagram showing an example of a hardware configuration of the radio base station and the user terminal according to an embodiment of the present invention.

For example, a radio base station, a user terminal and the like according to an embodiment of the present invention may function as a computer which performs processing in the radio communication method of the present invention. FIG. 19 is a diagram showing an example of the hardware configuration of a radio base station and a user terminal according to an embodiment of the present invention. The radio base station 10 and the user terminal 20 described previously may be physically formed as a computer device which includes a processor 1001, a memory 1002, a storage 1003, a communication device 1004, an input device 1005, an output device 1006, a bus 1007 and the like.

Note that, in the following description, a term "device" can be interpreted as a circuit, a device, a unit or the like. The hardware configuration of the radio base station 10 and the user terminal 20 may be provided so as to include one or more devices shown in the figure or may be provided so as not to include part of the devices.

Each of the functions in the radio base station 10 and the user terminal 20 is realized by reading predetermined software (program) on hardware such as the processor 1001 or the memory 1002, making the processor 1001 perform computation and controlling communication by the communication device 1004 and the reading and/or the writing of data in the memory 1002 and the storage 1003.

The processor 1001 makes, for example, its operating system operate so as to control the entire computer. The processor 1001 may be formed with a central processing unit (CPU) which includes interfaces with peripheral devices, a control device, a computation device, a resistor and the like. For example, the baseband signal processing section 104 (204), the call processing section 105 and the like described previously may be realized with the processor 1001.

Further, the processor 1001 reads programs (program codes), software modules and data from the storage 1003 and/or the communication device 1004 onto the memory 1002, and performs various types of processing according to them. As the programs, programs are used which make the computer perform at least part of the operations described in the embodiment discussed above. For example, the control section 401 of the user terminal 20 may be realized with control programs which are stored in the memory 1002 and which are operated with the processor 1001, and the other function blocks may be realized in the same manner.

The memory 1002 is a computer-readable recording medium and may be formed with at least one of, for example, a ROM (Read Only Memory), an EPROM (Erasable Programmable ROM) and a RAM (Random Access Memory). The memory 1002 may be called a resistor, a cache, a main memory (main storage device) or the like. The memory 1002 can store the programs (program codes), the software modules and the like which can be performed so as to practice the radio communication method according to an embodiment of the present invention.

The storage 1003 is a computer-readable recording medium and may be formed with at least one of, for example, an optical disc, such as a CD-ROM (Compact Disc ROM), a hard disc drive, a flexible disc, a magneto-optical disc, and a flash memory. The storage 1003 may be called an auxiliary storage device.

The communication device 1004 is a hardware component (transmission/reception device) for performing communication between computers through a wired and/or a wireless network, and is also called, for example, a network device, a network controller, a network card or a communication module. For example, the transmission/reception antenna 101 (201), the amplifying section 102 (202), the transmission/reception section 103 (203), the transmission path interface 106 and the like described previously may be realized with the communication device 1004.

The input device 1005 is an input device (for example, a keyboard or a mouse) which receives an input from the outside. The output device 1006 is an output device (for example, a display or a speaker) which produces an output to the outside. Note that the input device 1005 and the output device 1006 may be integrally formed (for example, a touch panel).

Further, the devices such as the processor 1001 and the memory 1002 are connected with the bus 1007 for communicating information. The bus 1007 may be formed with a single bus or may be formed with different buses between the devices.

Furthermore, the radio base station 10 and the user terminal 20 may be formed so as to include hardware components such as a microprocessor, a digital signal processor (DSP), an ASIC (Application Specific Integrated Circuit), a PLD (Programmable Logic Device), an FPGA (Field Programmable Gate Array) and the like, and part or the whole of each of the function blocks may be realized with the hardware. For example, the processor 1001 may be implemented with at least one hardware component.

Note that the terms which are described in the Description and/or the terms which are necessary for understanding the Description may be replaced with terms which have the same or similar meanings. For example, the channel and/or the symbol may be the signal (signaling). Further, the signal may be the message. Furthermore, the component carrier (CC) may be called a cell, a frequency carrier, a carrier frequency or the like.

Moreover, the radio frame may be formed with one or more periods (frames) in a time domain. The one or each of the periods (frames) which form the radio frame may be called the sub-frame. Furthermore, the sub-frame may be formed with one or more slots in the time domain. Furthermore, the slot may be formed with one or more symbols (OFDM symbols, SC-FDMA symbols or the like) in the time domain.

The radio frame, the sub-frame, the slot and the symbol individually indicate time units when signals are transmitted. The radio frame, the sub-frame, the slot and the symbol may be individually called other designations. For example, one sub-frame may be called Transmission Time Interval (TTI), a plurality of continuous sub-frames may be called TTI or one slot may be called TTI. In other words, the sub-frame and TTI may be a sub-frame (1 ms) in the existing LTE, may be a period (for example, 1-13 symbols) which is shorter than 1 ms or may be a period which is longer than 1 ms.

Here, TTI refers to, for example, the minimum time unit of scheduling in radio communication. For example, in the LTE system, the radio base station performs scheduling for assigning radio resources (a frequency bandwidth, transmission power and the like which can be used in the individual user terminals) to the user terminals in units of TTIs. Note that the definition of TTI is not limited to the configuration described above.

The resource block (RB) is a unit in which resources are assigned in the time domain and the frequency domain, and may include, in the frequency domain, one or more continuous sub-carriers. Further, the RB may include, in the time domain, one or more symbols, and may be the length of one slot, one sub-frame or one TTI. Each of one TTI and one sub-frame may be formed with one or more resource blocks. Note that the RB may be called a physical resource block (PRB: Physical RB), a PRB pair, a RB pair or the like.

Further, the resource block may be formed with one or more resource elements (RE). For example, one RE may be a radio resource region of one sub-carrier and one symbol.

Note that the structures of the radio frame, the sub-frame, the slot, the symbol and the like described above are simply illustrative. For example, the number of sub-frames included in the radio frame, the number of slots included in the sub-frame, the numbers of symbols and RBs included in the slot, the number of sub-carriers included in the RB, the number of symbols within TTI, the symbol length, the cyclic prefix (CP) length and the like can be changed variously.

Further, the information, the parameters and the like which are described in the Description may be indicated by absolute values, may be indicated by relative values with respect to predetermined values or may be indicated by other pieces of information corresponding thereto. For example, the radio resource may be indicated by a predetermined index.

The information, the signals and the like which are described in the Description may be indicated by use of any one of various different technologies. For example, the data, the instructions, the commands, the information, the signals, the bits, the symbols, the chips and the like which can be mentioned over the entire description may be indicated by a voltage, a current, an electromagnetic wave, a magnetic field, a magnetic particle, an optical field, a photon and arbitrary combinations thereof.

Further, the software, the instructions, the information and the like may be transmitted and received through a transmission medium. For example, when the software is transmitted by use of wired technologies (a coaxial cable, an optical fiber cable, a twisted pair and a digital subscriber line (DSL) and the like) and/or wireless technologies (infrared rays, microwaves and the like) from a web site, a server or a remote source, the wired technologies and/or wireless technologies are included in the definition of the transmission medium.

Furthermore, the radio base station in the Description may be interpreted as the user terminal. For example, the respective aspects/embodiments of the present invention may be applied to a configuration in which the communication between the radio base station and the user terminal is replaced with communication between a plurality of user terminals (D2D: Device-to-Device). In this case, the user terminal 20 may have the function of the radio base station 10 described above. Further, the wordings such as "uplink" and "downlink" may be interpreted as "side". For example, the uplink channel may be interpreted as a side channel.

Likewise, the user terminal in the Description may be interpreted as the radio base station. In this case, the radio base station 10 may have the function of the user terminal 20 described above.

The respective aspects/embodiments described in the Description may be used singly, may be used in combination or may be used by being switched when performed. Further, the notification of predetermined information (for example, the notification of "to be X") is not limited to an explicit notification and may be performed implicitly (for example, by failing to notify the predetermined information).

The notification of information is not limited to the aspects/the embodiment described in the Description and may be performed in another method. For example, the notification of information may be performed by the physical layer signaling (for example, DCI (Downlink Control Information) or UCI (Uplink Control Information)), higher layer signaling (for example, RRC (Radio Resource Control) signaling, the broadcast information (the MIB (Master Information Block), the SIB (System Information Block) or the like) or the MAC (Medium Access Control) signaling), another signal or a combination thereof. Further, the RRC signaling may be called a RRC message, and may be, for example, a RRC connection setup message or a RRC connection reconfiguration message. Furthermore, the MAC signaling may be notified with, for example, a MAC control element (MAC CE (Control Element)).

The respective aspects/embodiments described in the Description may be applied to systems which utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other appropriate radio communication methods and/or the next-generation systems which are enhanced based on them.

The order of the processing procedures, the sequences, the flowcharts and the like in the respective aspects/embodiments described in the Description may be replaced unless otherwise a contradiction arises. For example, in the methods described in the Description, the elements in various steps are provided in an illustrative order, and there is no limitation to the specific order provided.

The present invention is described above in details but it is obvious to a person skilled in the art that the present invention is not limited to the embodiments described in the Description. For example, the embodiments described above may be used singly or may be used in combination. The present invention can be modified and practiced as variations without departing from the spirit and the scope of the present invention defined by the scope of claims. Hence, the description of the Description is intended for illustrative explanation and is not intended to have any restrictive meaning for the present invention.

The present application is based on Japanese Patent Application No. 2016-016195 filed on Jan. 29, 2016, the entire content of which is expressly incorporated by reference herein.

The invention claimed is:

1. A terminal comprising:
    a receiver that receives information on at least one band part, each band part being assigned with a physical resource block index independently, and information on a given communication parameter used for the band part; and
    a processor that performs at least one of UL transmission and DL reception by using the given communication parameter,
    wherein when a plurality of the band parts are configured, the physical resource block indexes are separately and non-consecutively assigned to the plurality of band parts.

2. The terminal according to claim 1, wherein the receiver receives the information on the band part and information on subcarrier spacing corresponding to the band part by higher layer signaling and the processor performs reception of a downlink control channel and a downlink shared channel within the band part.

3. The terminal according to claim 1, wherein subcarrier spacing is able to be configured differently for a plurality of band parts.

4. The terminal according to claim 2, wherein the subcarrier spacing is able to be configured differently for a plurality of band parts.

5. The terminal according to claim 1, wherein when the plurality of band parts are configured, the physical resource block indexes starting anew are assigned to each of the plurality of band parts.

6. A radio communication method for a terminal, comprising:
    receiving information on at least one band part, each band part being assigned with a physical resource block index independently, and information on a given communication parameter used for the band part; and
    performing at least one of UL transmission and DL reception by using the given communication parameter,
    wherein when a plurality of the band parts are configured, the physical resource block indexes are separately and non-consecutively assigned to the plurality of band parts.

* * * * *